United States Patent
Bosworth

(10) Patent No.: US 10,875,644 B2
(45) Date of Patent: Dec. 29, 2020

(54) GROUND MANIPULATION SYSTEM AND METHOD FOR FIXING AN AIRCRAFT

(71) Applicant: Aurora Flight Sciences Corporation, Manassas, VA (US)

(72) Inventor: William Bosworth, Cambridge, MA (US)

(73) Assignee: Aurora Flight Sciences Corporation, Manassas, VA (US)

(*) Notice: Subject to any disclaimer, the term of this patent is extended or adjusted under 35 U.S.C. 154(b) by 206 days.

(21) Appl. No.: 15/856,301

(22) Filed: Dec. 28, 2017

(65) Prior Publication Data

US 2019/0202554 A1   Jul. 4, 2019

(51) Int. Cl.
*B64C 39/02* (2006.01)
*B64C 25/32* (2006.01)
*B60L 53/60* (2019.01)
*B60L 53/14* (2019.01)
*B25J 5/00* (2006.01)
*B25J 15/00* (2006.01)
(Continued)

(52) U.S. Cl.
CPC .............. *B64C 39/024* (2013.01); *B25J 5/00* (2013.01); *B25J 15/0028* (2013.01); *B60L 53/14* (2019.02); *B60L 53/60* (2019.02); *B64C 25/32* (2013.01); *B64C 39/022* (2013.01); *B64F 1/007* (2013.01); *B64F 1/16* (2013.01); *B64C 2201/027* (2013.01); *B64C 2201/108* (2013.01); *B64C 2201/12* (2013.01); *B64C 2201/126* (2013.01); *B64C 2201/187* (2013.01)

(58) Field of Classification Search
CPC ............ B64C 39/024; B64C 2201/027; B64C 2201/108; B64C 2201/126; B64C 25/26; B64C 25/32; B64C 25/001; B64C 25/00; B64C 2201/18; B64C 27/08; B64C 27/20; B64C 39/022; B64C 2201/066; B60L 53/60; B60L 53/14; B25J 5/00; B25J 15/0028; B64F 1/007; B64F 1/16; B64F 1/125; B64F 1/12
See application file for complete search history.

(56) References Cited

U.S. PATENT DOCUMENTS 7,762,362 B2   7/2010   Cutkosky et al.
9,840,327 B1 * 12/2017   Frank .................... B64F 1/22
2012/0112008 A1   5/2012   Holifield et al.
(Continued)

FOREIGN PATENT DOCUMENTS

CN   106995053   8/2017
CN   105314102 B   9/2017
(Continued)

OTHER PUBLICATIONS

Extended European search report for Application No. EP 18214179.6, dated Apr. 5, 2019.

*Primary Examiner* — Richard R. Green
*Assistant Examiner* — William L Gmoser
(74) *Attorney, Agent, or Firm* — Michael Stanley Tomsa; McAndrews, Held & Malloy, Ltd.; Eugene H. Nahm

(57) ABSTRACT

Disclosed herein are aircraft and landing gear systems configured to fix an aircraft to the ground. For example, the aircraft and aircraft systems configured for ground manipulation. In one aspect, an aircraft with an arm and end-effector may be fixed a ground surface to facilitate ground-based robotic manipulation tasks.

17 Claims, 19 Drawing Sheets

(51) Int. Cl.
  *B64F 1/00* (2006.01)
  *B64F 1/16* (2006.01)

(56) References Cited

U.S. PATENT DOCUMENTS

| | | | |
|---|---|---|---|
| 2014/0263852 A1* | 9/2014 | Walker | B64C 39/024 |
| | | | 244/53 R |
| 2016/0144958 A1 | 5/2016 | Woodworth et al. | |
| 2016/0200207 A1* | 7/2016 | Lee | B60L 53/30 |
| | | | 320/109 |
| 2016/0311545 A1 | 10/2016 | Parks et al. | |
| 2017/0123435 A1* | 5/2017 | Myeong | B25J 9/1676 |
| 2017/0152059 A1* | 6/2017 | Peng | B64D 31/00 |
| 2017/0190422 A1* | 7/2017 | Beaman | B64D 1/00 |
| 2017/0313421 A1* | 11/2017 | Gil | B64D 1/00 |
| 2017/0320216 A1* | 11/2017 | Strauss | B25J 15/0009 |
| 2017/0331323 A1 | 11/2017 | Ehrmantraut | |
| 2017/0344000 A1* | 11/2017 | Krishnamoorthy | G08G 5/0013 |
| 2017/0355453 A1* | 12/2017 | Kim | B64D 31/06 |
| 2017/0366051 A1* | 12/2017 | Holland | H02K 1/06 |
| 2017/0369169 A1* | 12/2017 | Lee | B64D 5/00 |
| 2018/0074488 A1* | 3/2018 | Cantrell | G06Q 10/06311 |
| 2018/0080904 A1* | 3/2018 | Al Nahwi | F16L 1/265 |
| 2018/0118374 A1* | 5/2018 | Lombardini | B60L 9/00 |
| 2018/0130008 A1* | 5/2018 | Liu | B64D 47/08 |
| 2018/0196418 A1* | 7/2018 | Meier | G05D 1/0225 |
| 2018/0207807 A1* | 7/2018 | Jalenques | B23Q 7/046 |
| 2018/0251212 A1* | 9/2018 | Sugaki | B64C 27/08 |
| 2018/0257241 A1* | 9/2018 | Claretti | B25J 15/0028 |
| 2018/0257774 A1* | 9/2018 | Volpi | B25J 11/00 |
| 2018/0335404 A1* | 11/2018 | Amer | G01J 5/10 |
| 2018/0370652 A1* | 12/2018 | Vendrame | A47B 3/08 |
| 2019/0047696 A1* | 2/2019 | Gwin | B25J 9/1085 |
| 2019/0077505 A1* | 3/2019 | Akens | H02J 7/0042 |
| 2019/0126493 A1* | 5/2019 | Jonas | B25J 15/028 |
| 2019/0127064 A1* | 5/2019 | Beardsley | B05B 13/005 |
| 2019/0166765 A1* | 6/2019 | Maor | G06T 5/50 |
| 2019/0217952 A1* | 7/2019 | Zawadzki | B64C 39/022 |
| 2019/0229462 A1* | 7/2019 | Hodgson | B64C 39/024 |

FOREIGN PATENT DOCUMENTS

| | | |
|---|---|---|
| DE | 202017005121 U1 | 11/2017 |
| EP | 2003057 A2 | 12/2008 |
| EP | 2213570 A2 | 8/2010 |
| EP | 3150491 A1 | 4/2017 |

* cited by examiner

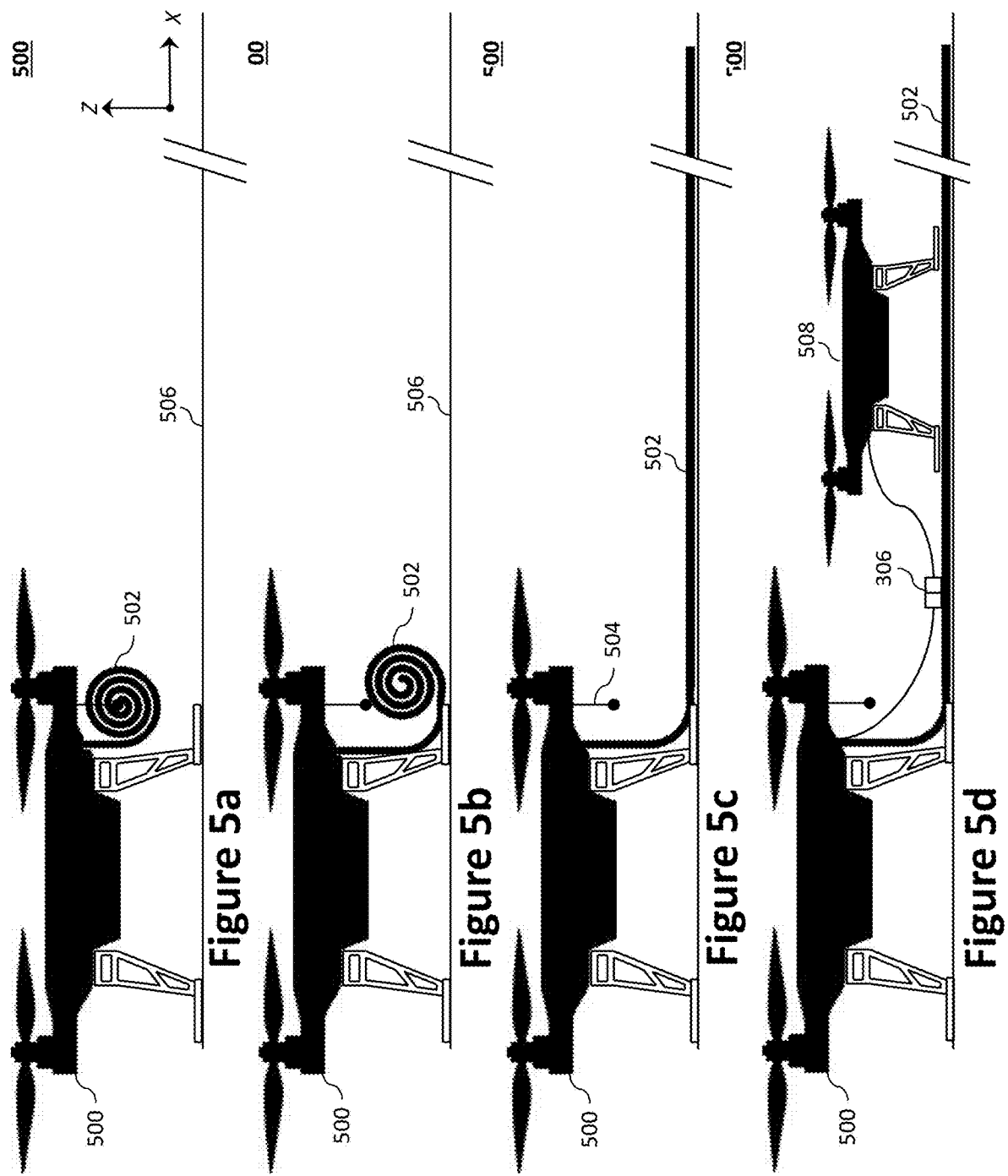

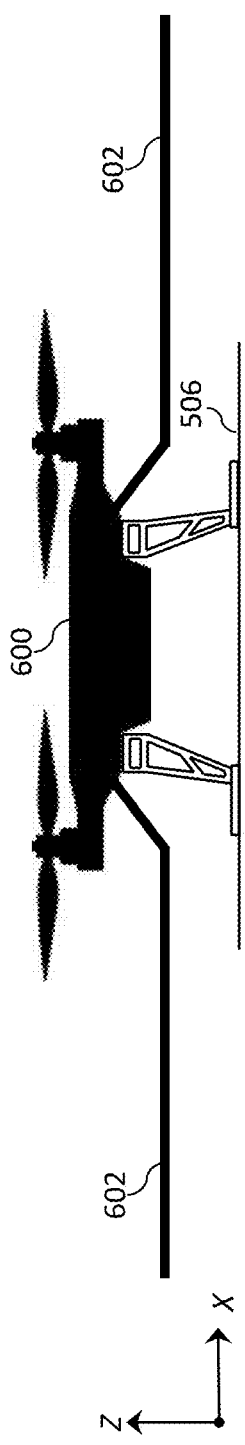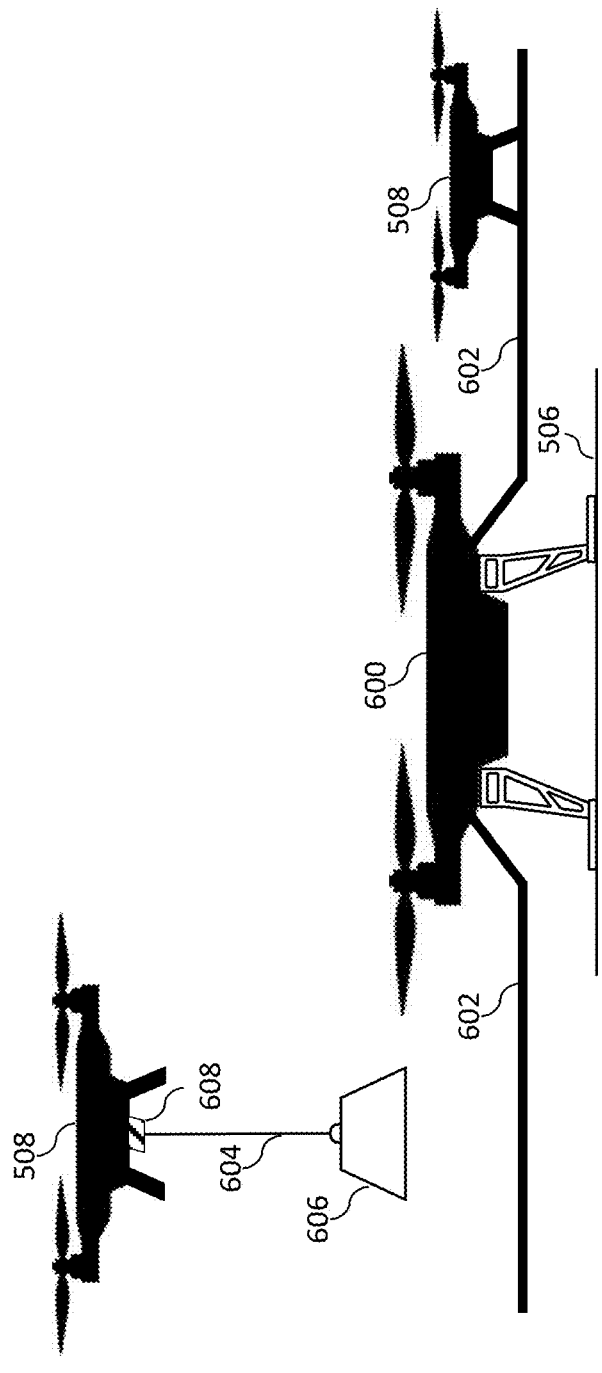

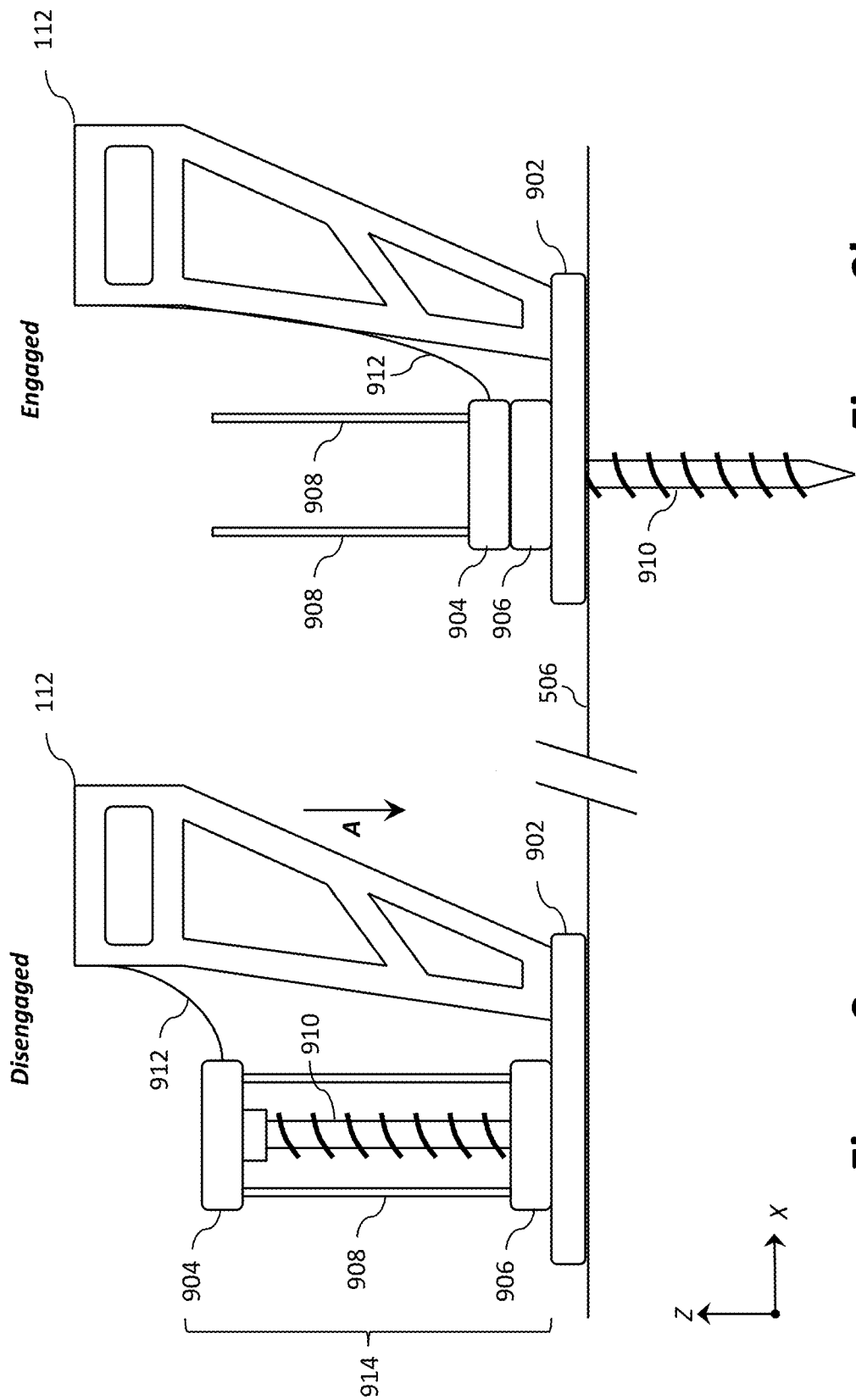

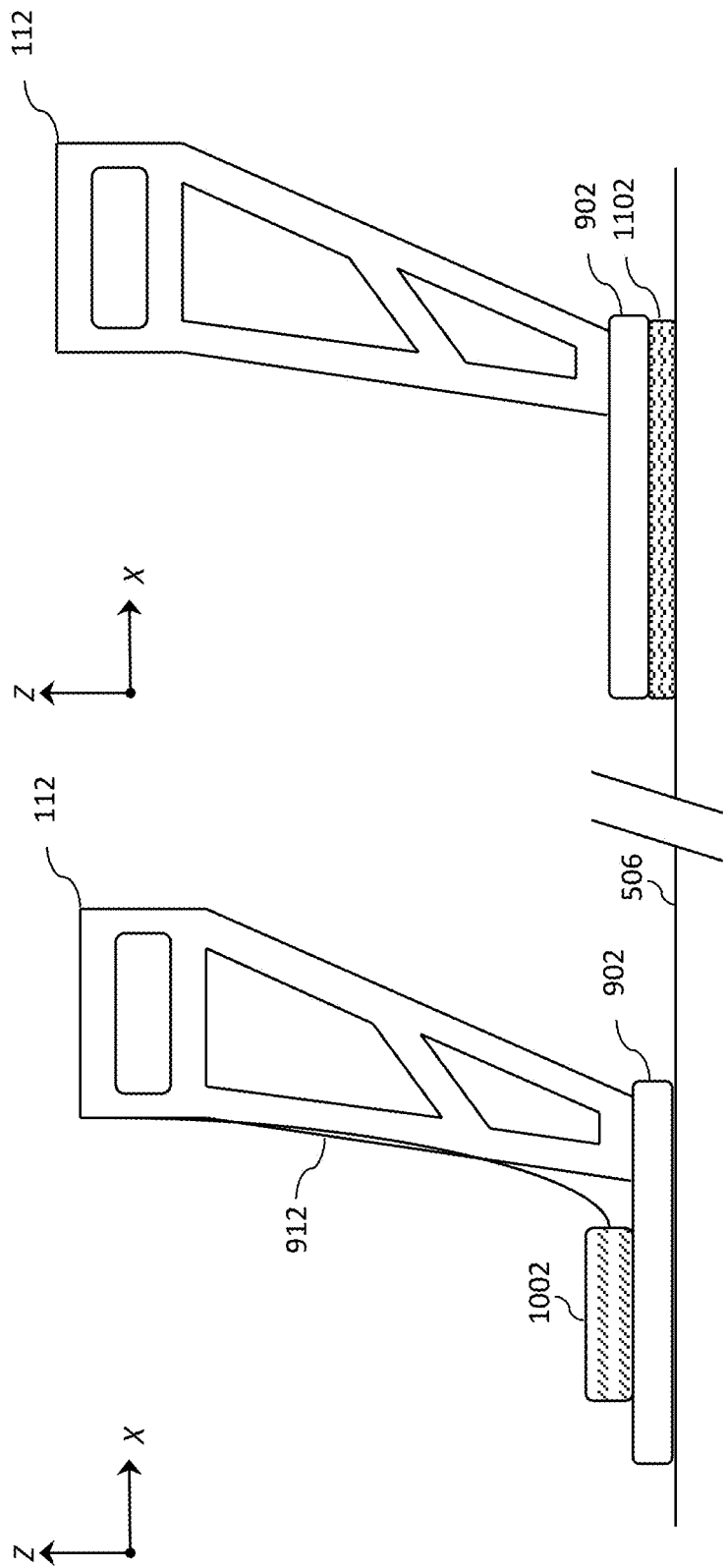

GROUND MANIPULATION SYSTEM AND METHOD FOR FIXING AN AIRCRAFT

TECHNICAL FIELD

This present invention generally relates to aircraft systems, more specifically, to aircraft and landing gear systems configured to fix an aircraft to the ground.

BACKGROUND

Unmanned mobile robotic manipulation is most commonly performed by attaching robotic arms to Unmanned Ground Vehicles (UGV). For example, the iRobot Packbot is a tank-treaded vehicle with a robotic arm attached to its base (i.e., chassis). In practice, these vehicles are operated by a human via a remote control. A common defense application for UGVs is manipulation/disposal of Improvised Explosive Devices (IEDs). UGVs, however, are limited in that a ground path must be available for the UGV to navigate to a waypoint (e.g., the location of the IED). For example, obstacles (e.g., streams, ravines, buildings, etc.) can prohibit access to the waypoint. Such obstacles may be avoided through use of an aircraft.

Aircraft, including Unmanned Aerial Vehicles (UAVs)), have been developed with robotic arms for aerial manipulation (i.e., used to pick up and carry objects during flight). Existing aircraft, however, cannot perform ground manipulation akin to a UGV because aircraft are lightweight and would tip over due to the weight of the extended robotic arm and/or any target objectives being manipulated by the robotic arm. While one solution would be to simple increase the weight of the aircraft (i.e., the approach applied to UGVs), adding weight to an aircraft during flight is inefficient and introduces issues with flight dynamics. For example, heavier aircraft suffer from reduced flight time, reduce maneuverability, increased size, and generally reduced airworthiness. Therefore, a need exists for a system and method to fix (e.g., secure) an aircraft to a ground surface to facilitate ground-based robotic manipulation tasks.

SUMMARY OF THE INVENTION

Disclosed herein are aircraft and landing gear systems configured to fix an aircraft to the ground to perform, for example, ground manipulation. For example, an aircraft with an arm and end-effector may be fixed a ground surface to facilitate ground-based robotic manipulation tasks.

According to a first aspect, an aircraft for providing ground manipulation of a target objective at a ground surface aircraft comprises: an airframe; a plurality of rotor booms extending radially from the airframe; a plurality of propulsors, each of said plurality of propulsors positioned at a distal end of one of said plurality of rotor booms, wherein the plurality of propulsor are configured to be controlled by an aircraft processor; an articulating arm coupled at its proximal end to the airframe; an end-effector coupled to a distal end of the articulating arm to engage the target objective; and a ground-fixing system to secure the airframe to the ground surface.

In certain aspects, the ground-fixing system includes a flexible landing strip.

In certain aspects, the flexible landing strip is configured to unroll from the aircraft to provide a landing area on the ground surface for a second aircraft.

In certain aspects, the flexible landing strip is configured roll about a spindle mechanism that is secured to the aircraft during flight.

In certain aspects, the second aircraft is configured to charge the aircraft.

In certain aspects, the ground-fixing system includes a longitudinal structure to support placement of additional mass.

In certain aspects, the ground-fixing system includes a longitudinal structure to support a second aircraft.

In certain aspects, the ground-fixing system includes a longitudinal structure to support a weight provided by a second aircraft.

In certain aspects, the ground-fixing system includes a reservoir to house a fluid or a particulate.

In certain aspects, the reservoir includes a filler neck to pass the fluid or the particulate to the reservoir.

In certain aspects, the ground-fixing system includes an anchor coupled to the airframe via a lead line.

In certain aspects, the aircraft is configured to drop or propel the anchor to the ground surface.

In certain aspects, the anchor is a sharp weight to penetrate or lodge into the ground surface.

In certain aspects, the lead line is coupled to the airframe via a winch.

In certain aspects, the winch is configured to winch the lead line until the aircraft is on the ground surface.

In certain aspects, the winch is configured to drive until a portion of the lead line between the airframe and the ground surface is taught.

In certain aspects, the ground-fixing system includes a screw-driving assembly to couple the aircraft to the ground surface.

In certain aspects, the screw-driving assembly is coupled to the airframe via a strut.

In certain aspects, the screw-driving assembly includes an upper driving mechanism and a screw.

In certain aspects, the upper driving mechanism include an electric motor to rotate the screw.

In certain aspects, the aircraft is configured to selectively supply power to the electric motor via a cable.

In certain aspects, the screw-driving assembly further includes a lower driving mechanism to engage the screw.

In certain aspects, the screw-driving assembly further includes a set of guide shafts to linearly guide the upper driving mechanism as the screw is rotated.

In certain aspects, the screw-driving assembly further includes a frangible link configured to detach the screw.

In certain aspects, the frangible link is configured to break when the electric motor is overdriven.

In certain aspects, the ground-fixing system includes an electro-magnet to couple the aircraft to the ground surface.

In certain aspects, the ground-fixing system includes a bonding material to form bond with the ground surface.

In certain aspects, the ground-fixing system includes one or more laterally displaceable gripping devices to clamp with a protruding feature of the ground surface.

In certain aspects, the laterally displaceable gripping device includes a rod-driving actuator and a threaded rod having a foot pivotally attached thereto.

In certain aspects, the foot includes a gripping material to increase reduce friction with, or conform to, a surface of the protruding feature.

In certain aspects, the ground-fixing system includes one or more pivoting arms to clamp with a protruding feature of the ground surface.

In certain aspects, each of the one or more pivoting arms includes (1) a first portion pivotally coupled aircraft at a proximal end and (2) a second portion pivotally coupled at its proximal end to the distal end of the first portion.

In certain aspects, the second portion includes a gripping material to increase friction with, or conform to, a surface of the protruding feature.

According to a second aspect, an aircraft for providing auxiliary power to a second aircraft comprises: an airframe; a plurality of rotor booms extending radially from the airframe; a plurality of propulsors, each of said plurality of propulsors positioned at a distal end of one of said plurality of rotor booms, wherein the plurality of propulsor are configured to be controlled by an aircraft processor; and a battery to supply power to the second aircraft via a cable and an electrical connector.

In certain aspects, the electrical connector includes one or more magnets and a plurality of electrical pin connectors.

In certain aspects, the electrical pin connectors are configured to supply power from the battery to second aircraft.

In certain aspects, the electrical pin connectors are further configured to exchange data between the aircraft and the second aircraft.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIG. 1b illustrates a block diagram of an example aircraft control system for the aircraft of FIG. 1a.

FIGS. 5a through 5d illustrate an aircraft equipped with an example flexible landing strip.

FIGS. 6a and 6b illustrate an aircraft equipped with example support structures.

FIGS. 9a and 9b illustrate an aircraft equipped with an example screw-driving assembly.

FIG. 10 illustrates an aircraft equipped with an example electro-magnet.

FIG. 11 illustrates an aircraft equipped with an example bonding material.

DETAILED DESCRIPTION

Figure 1A:
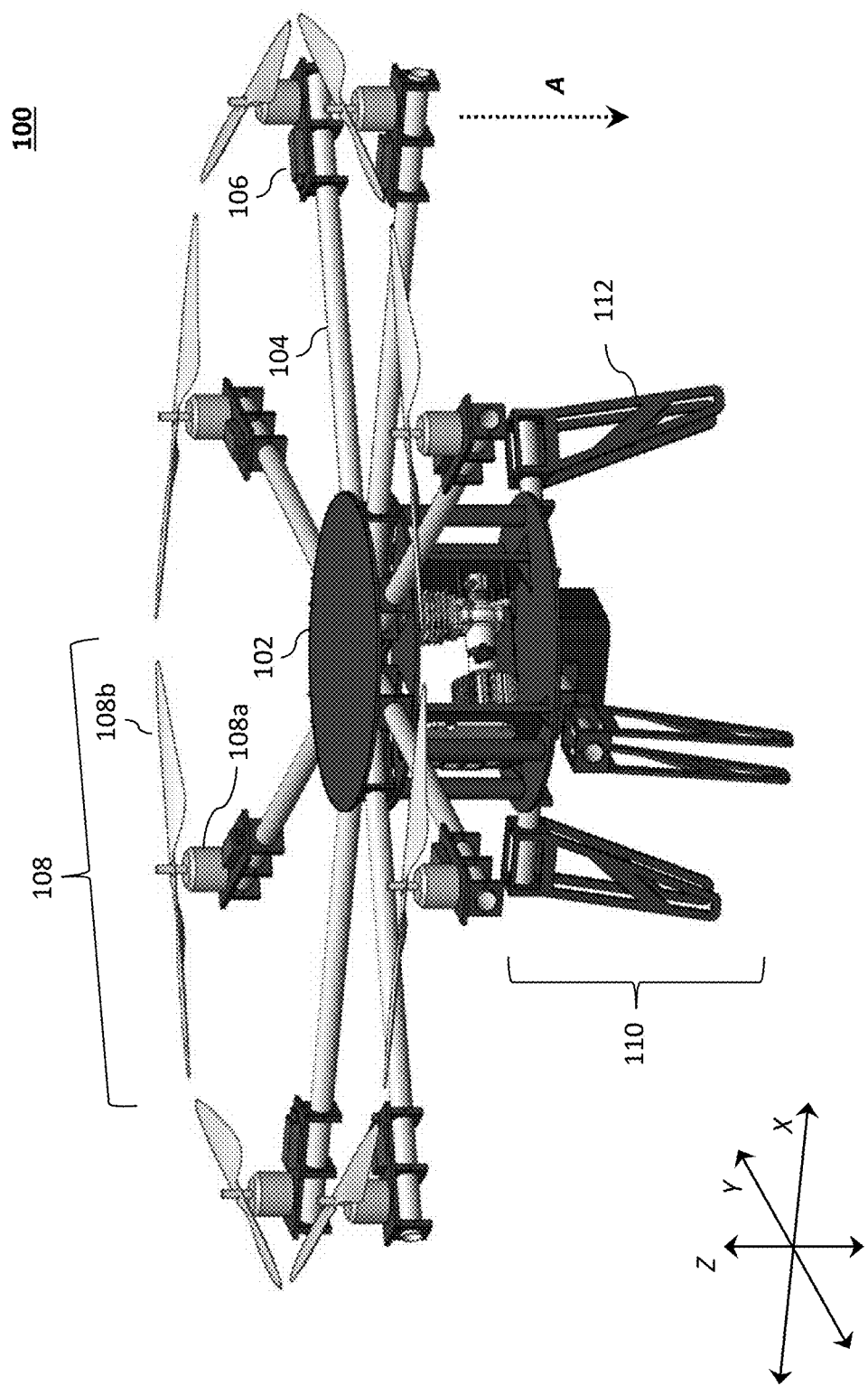
FIG. 1a illustrates an example multi-rotor vertical take-off and landing (VTOL) aircraft for use with a ground manipulation system.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. For this disclosure, the following terms and definitions shall apply:

The terms "aerial vehicle" and "aircraft" refer to a machine capable of flight, including, but not limited to, fixed-wing aircraft, UAVs, variable wing aircraft, and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of Whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electro-magnetic, or otherwise manifested. The terms "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is an aircraft with a ground manipulation system that is capable of being deployed to a remote area to perform, for example, ground manipulation of a target objective. For example, an aircraft configured with an articulating arm and end-effector may be flown to a waypoint. At the waypoint, the aircraft may land on the ground surface adjacent/near the target objective. Once on the ground surface, the aircraft may be fixed to the ground surface to facilitate ground-based robotic manipulation tasks. Once fixed to the ground surface, the articulating arm and end-effector can be used in a manner similar to a UGV-robotic system.

The disclosed aircraft and ground manipulation system offer a number of advantages. First, the aircraft may fly to a waypoint that is unavailable to a UGV-robotic system, which required a clear ground path to the target objective. Second, an aircraft that is fixed to the ground surface eliminates floating base dynamics that are intrinsic to aerial manipulation. Finally, an aircraft that is positioned on the ground surface is more amenable to facilitating additional connections (e.g., mechanical, electrical, communication, etc.) to provide additional functionality. Indeed, secondary aircraft may be deployed to the waypoint to support the primary aircraft. For example, the secondary aircraft may serve as an auxiliary power supply to the aircraft-robotic arm package by delivering auxiliary electrical power to sustain longer missions (e.g., operating time). Firmly grounding an aircraft, however, is generally more challenging than a UGV, which benefit from much more favorable size weight and power (SWaP) constraints. That is, over moderately flat ground, UGVs travel with significantly more efficiency, and thus UGVs can be much heavier. That mass can be used to generate favorable friction with the ground, thereby fixing the UGV to the ground surface.

As will be discussed, the ground manipulation system and various ground-fixing techniques disclosed herein may be configured as a retrofit system to attach to any aircraft capable of carrying its system weight, making ever-improving, low-cost aircraft available for future use. In certain aspects, the ground manipulation system and the aircraft may share a processor, or use separate, dedicated processors (i.e., one processor for flight operation and one processor for operating the ground manipulation system). The disclosed ground manipulation system may be employed in connection with various aircraft configurations, including, inter alia, multi-rotor consumer VTOL UAVs.

A suitable aircraft for use with a ground manipulation system includes the multi-rotor VTOL UAV 100 illustrated in FIG. 1*a*. As illustrated, the UAV 100 generally comprises an airframe 102 (e.g., a fuselage or other structure), a plurality of rotor booms 104 (e.g., longitudinal booms) extending radially from the airframe 102, landing gear 110, and a plurality of propulsors 108. While a multi-rotor VTOL UAV is illustrated throughout the figures, the teachings of the present disclosure may similarly be applied to other aircraft, including fixed-wing aircraft.

Figure 3A:
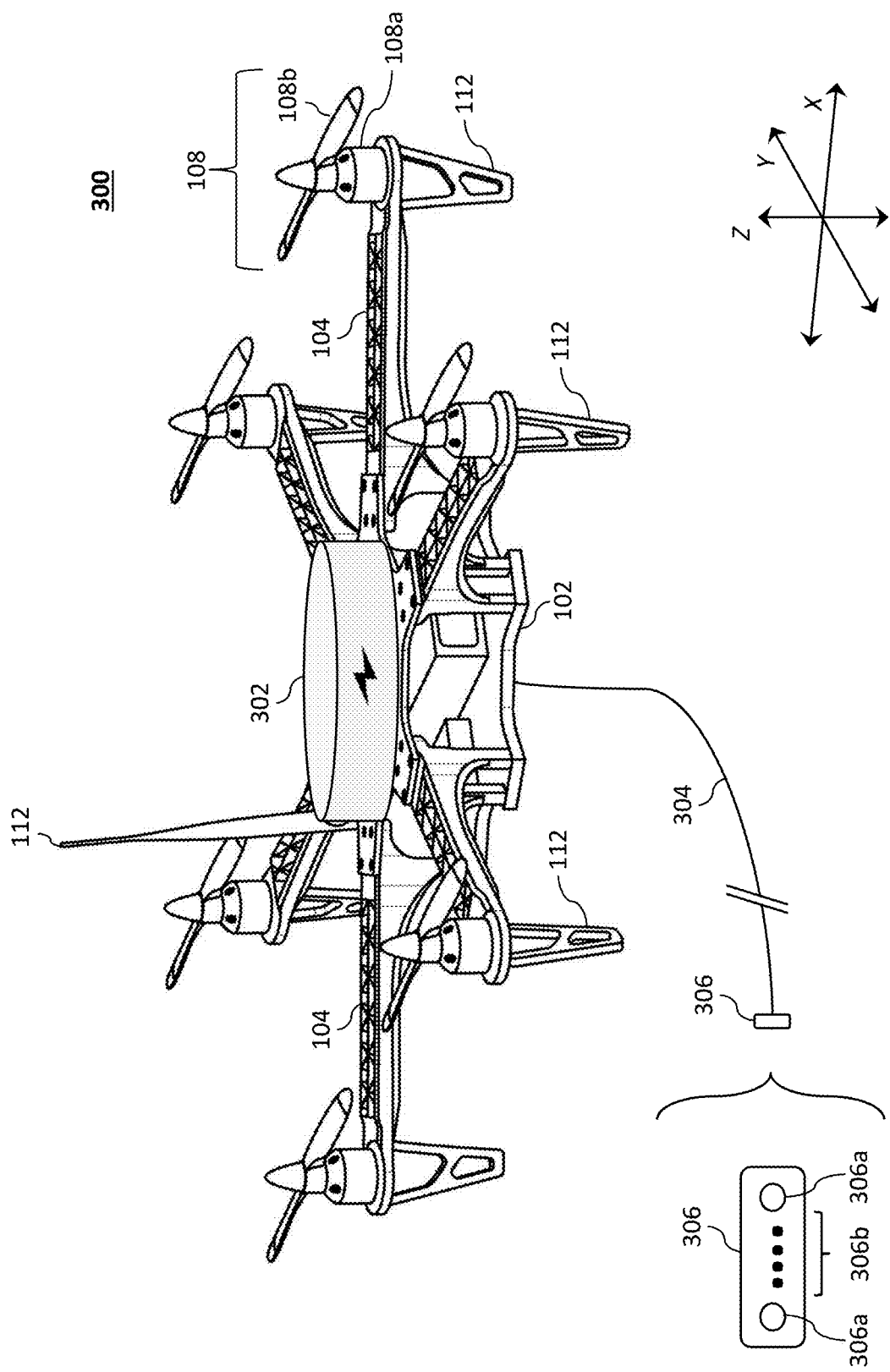
FIGS. 3a and 3b illustrate an example auxiliary power aircraft.

The airframe 102 may be coupled with a proximal end of each of the plurality of rotor booms 104 such that the distal ends of the plurality of rotor booms 104 extend radially from the airframe 102. The airframe 102 and the plurality of rotor booms 104 may be fabricated as a singular unit, or as separate components to be coupled to one another. The distal end of each of the plurality of rotor booms 104 may be coupled with a propulsor 108, each of which is illustrated as a lift motor 108*a* coupled to, and configured to drive/rotate, a propeller 108*b*. Each of said plurality of propulsors 108 can be placed at a distal end of a rotor boom 104 and oriented to direct thrust downward (direction A) to provide lift. The lift motor 108*a* may be an electric motor controlled via an electronic speed controller (ESC) 106. To that end, an ESC 106 may also be provided on (or integrated with) each rotor boom 104, for example, adjacent the lift motor 108*a*. While the UAV 100 is illustrated as having eight propulsors 108 (i.e., an octo-rotor aircraft), a person of skill in the art would understand that additional, or fewer, propulsors 108 may be employed to achieve a desired function and depending on, for example, thrust requirements. For example, FIG. 3*a* illustrates a similar UAV, but having six propulsors 108 (i.e., an hexa-rotor aircraft)

While the lift motors 108*a* are illustrated at the distal end of each rotor boom 104, the lift motors 108*a* (or a single lift motor 108*a*) may instead be positioned at the airframe 102 and configured to drive (rotate) the one or more propellers 108*b* via a gearbox and/or a driveshaft between the lift motor 108*a* and the one or more propellers 108*b*. Further, while each rotor boom 104 is illustrated as having only a single propulsor 108, multiple propulsors 108 may be provided at the distal end of each rotor boom 104. For example, a cross-member may be positioned at the distal end of each rotor boom 104 and arranged to space the propulsors 108 from one another (e.g., perpendicularly to the length of the rotor boom 104) or to otherwise prevent interference between propellers 108*b* (e.g., a staggered/overlapping configuration). The components of the UAV 100 may be fabricated from metal, a composite material, or a combination thereof.

While the landing gear 110 is illustrated as a plurality of rigid struts 112 positioned along the perimeter of the airframe 102, the plurality of struts 112 may instead be positioned along the outer perimeter of the UAV 100 (e.g., at the distal end of each rotor boom 104) to increase ground stability via a larger ground foot-print. For example, as illustrated in FIG. 3*a*, the proximal end of each strut 112 may couple to a rotor boom 104, while the distal end of each strut 112 contacts the ground. Depending on ground terrain, as will be discussed below, additional components may be added to the landing gear 110, such as skids, wheels, ground contact plates or disks, etc. For example, when presented with unstable ground (e.g., sand, loose dirt, etc.), one or more ground contact plates (or disks) may be positioned at a distal end of each strut 112 to increase the footprint area of each ground contact point. In another example, two or more struts 112 may be connected at their distal ends via a rail.

In certain aspects, the strut 112 may be removed (e.g., removably coupled) from the UAV 100 (e.g., via the rotor booms 104) to facilitated replacement and/or interchangeability of the struts 112. For example, the strut 112 may be replaced when damaged or based on the type of ground surface. That is, certain ground surfaces may require that the strut 112 employ a different type of ground contact surfaces, for example, a large footprint (e.g., the ground contact plates) or to provide a strut 112 configured with a particular ground-fixing technique, examples of which are describe below in relation to FIGS. 9*a* through 16*b*. While illustrated in the figures as separate components, each strut 112 and its affiliated rotor boom 104 may instead be fabricated as a singular unit.

Figure 1B:
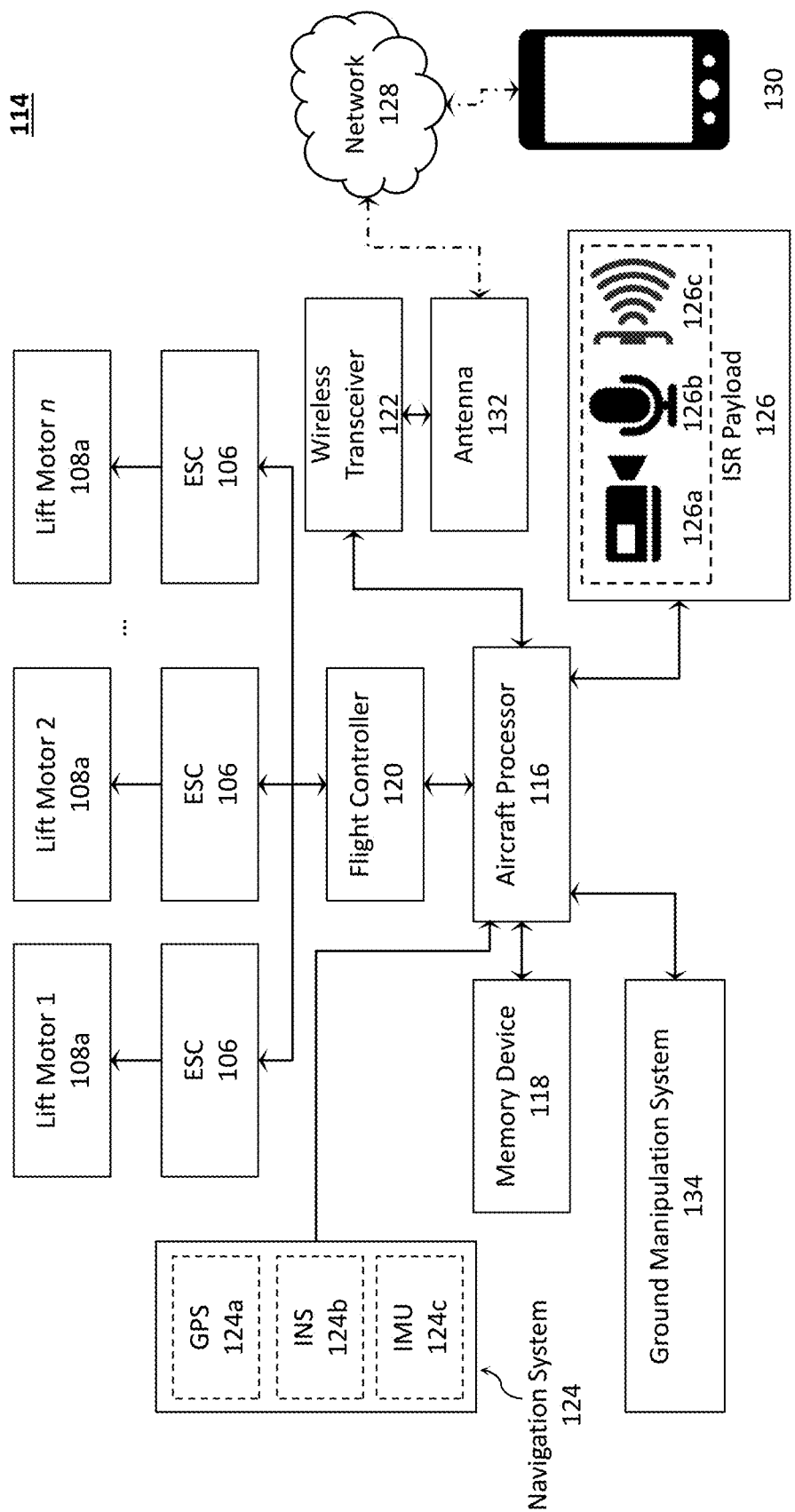

FIG. 1*b* illustrates a block diagram of an example aircraft control system 114 for the UAV 100. The aircraft control system 114 is configured to control the various aircraft components and functions of the UAV 100. As illustrated, the UAV 100 includes one or more aircraft processors 116 communicatively coupled with at least one memory device 118, a ground manipulation system 134, a flight controller 120, a wireless transceiver 122, and a navigation system 124. The aircraft processor 116 may be configured to perform one or more operations based at least in part on instructions (e.g., software) and one or more databases stored to the memory device 118 (e.g., hard drive, flash memory, or the like).

The aircraft control system 114 may further include other desired services, such as a wireless transceiver 122 coupled with an antenna 132 to communicate data between the UAV 100 and a remote resource 130 (e.g., a base station or a portable electronic device, such as smartphones, tablets, and laptop computers). For example, the UAV 100 may communicate data (processed data, unprocessed data, etc.) with the remote resource 130 over a network 128. In certain aspects, the wireless transceiver 122 may be configured to communicate (e.g., with the remote resource 130) using one or more wireless standards such as Bluetooth (e.g., short-wavelength, Ultra-High Frequency (UHF) radio waves in the industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote resource 130 may facilitate monitoring and/or control of the UAV 100 and its payload(s), including the ground manipulation system 134 and the intelligence, surveillance, and reconnaissance (ISR) payload 126.

The aircraft processor 116 may be operatively coupled to the flight controller 120 to control operation of the various actuators (e.g., those to control movement of any flight surfaces) and/or lift motor 108*a* (e.g., via ESC 106) in response to commands from an operator, autopilot, a navigation system 124, or other high-level system via the wireless transceiver 122. In certain aspects, the aircraft processor 116 and the flight controller 120 may be integrated into a single component or circuit. In operation, the flight controller 120 may dynamically (i.e., in real-time or near real-time) and independently adjust thrust from each of the propulsors 108 on each rotor boom 104 during the various stages of flight (e.g., take-off, cruising, landing) via the ESC 106 to control roll, pitch, or yaw of the UAV 100. In other words, the flight controller 120 can independently control each of the lift motors 108a on a given rotor boom 104 to generate a desired lift thrust for each of the lift motors 108a. For example, the flight controller 120 may vary the revolutions per minute (RPM) of the propellers 108b and/or, where desired, vary the pitch of the rotor blades. Specifically, the lift motors 108a may be controlled by adjusting power supplied to each electric lift motor 108a from a power supply (e.g., a battery pack or a battery bank) via the ESC 106.

The aircraft processor 116 may be operatively coupled to the navigation system 124, which may include a global positioning system (GPS) 124a that is communicatively coupled with an Inertial Navigation System (INS) 124b and/or an inertial measurement unit (IMU) 124c, which can include one or more gyroscopes and accelerometers. The GPS 124a gives an absolute drift-free position value that can be used to reset the INS solution or can be blended with it by use of a mathematical algorithm, such as a Kalman Filter. The navigation system 124 may communicate, inter alia, inertial stabilization data to the aircraft processor 116, which may be used to facilitate operation of the ground manipulation system 134. In certain aspects, the GPS 124a may be (or include) a differential global positioning system (DGPS). A DGPS provides improved location accuracy; achieving accuracy to about 10 cm. A DGPS uses a network of fixed ground-based reference stations to broadcast a difference between the positions indicated by the GPS satellite systems and the known fixed positions. These stations broadcast the difference between the measured satellite pseudoranges and actual (internally computed) pseudoranges, and receiver stations may correct their pseudoranges by the same amount. The digital correction signal is typically broadcast locally over ground-based transmitters of shorter range.

To collect data and/or monitor an area, the UAV 100 may further be equipped with an ISR payload 126 comprising, for example, one or more cameras 126a (e.g., an optical instrument for recording or capturing images and/or video, including light detection and ranging (LIDAR) devices), audio devices 126b (e.g., microphones, echolocation sensors, etc.), and other sensors 126c to facilitate ISR functionality and provide ISR data (e.g., photographs, video, audio, sensor measurements, etc.). The ISR payload 126 is operatively coupled to the aircraft processor 116 to facilitate communication of the ISR data between the ISR payload 126 and the aircraft processor 116. The ISR data may be used to navigate the UAV 100 and/or control operation of the ground manipulation system 134. The ISR payload 126 may be rotatably and pivotally coupled to, for example, the airframe 102 (or another structural component, such as the rotor booms 104) via a gimbal system to enable the ISR payload 126 to be oriented toward a target area. The ISR data may be dynamically or periodically communicated from the UAV 100 to the remote resource 130 over the network 128 via the wireless transceiver 122, or stored to the memory device 118 for later access or processing.

The aircraft processor 116 may be operatively coupled with the ground manipulation system 134 to provide two-way communication between the ground manipulation system 134 (e.g., its actuators, processor(s), and/or sensors) and the aircraft processor 116. In operation, the aircraft processor 116 may communicate control command data to the ground manipulation system 134 and receive feedback data relating to the ground manipulation system's 114 contact with surfaces and position sensing of the target objective. For example, commands may be communicated to the ground manipulation system 134 from the aircraft processor 116 based at least in part on commands from an operator, autopilot, the navigation system 124, the ISR payload 126, or other high-level systems.

Figure 2A:
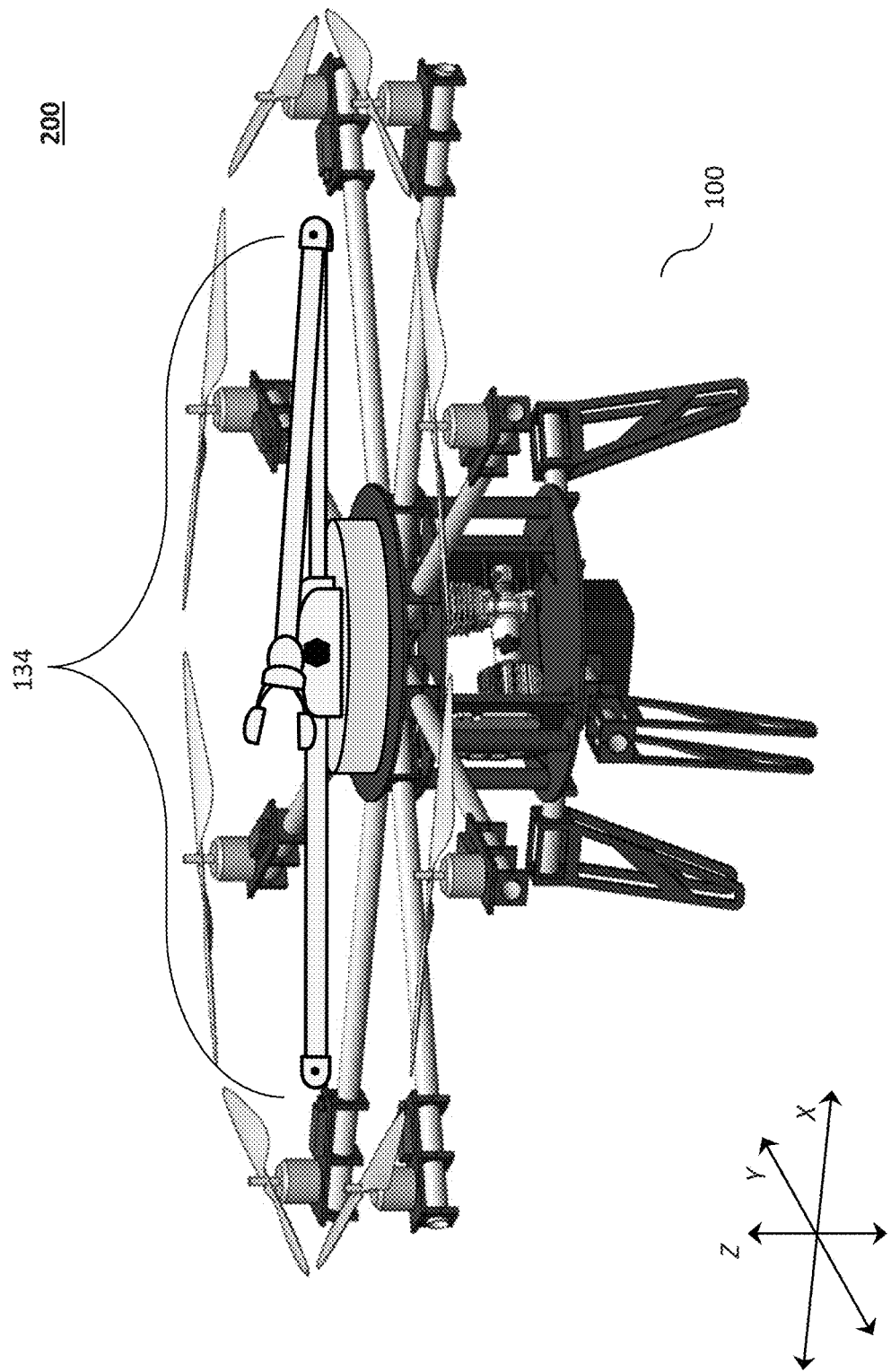
FIGS. 2a through 2c illustrate example aircraft equipped manipulation systems.
Figure 2B:
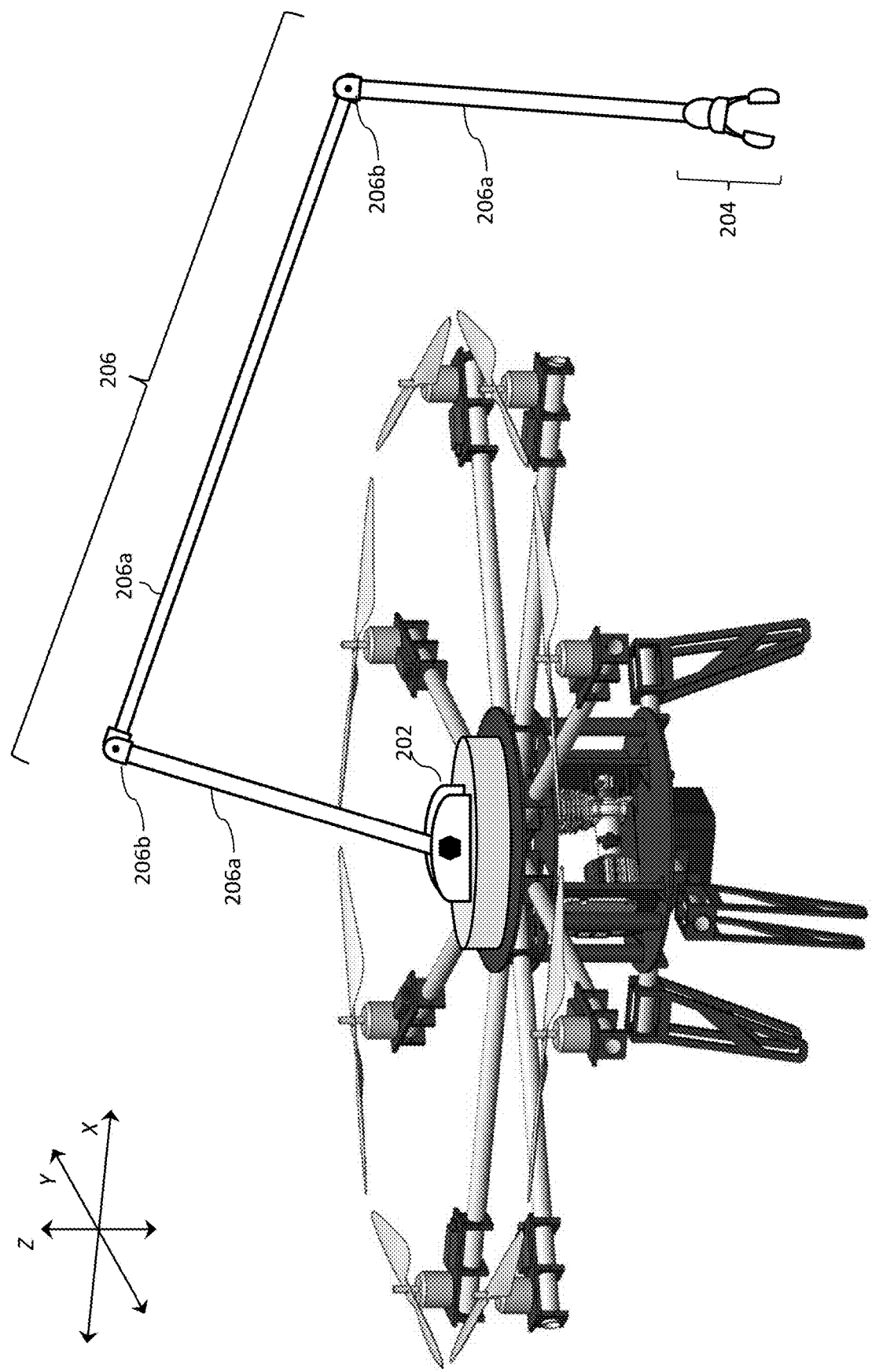
Figure 2C:
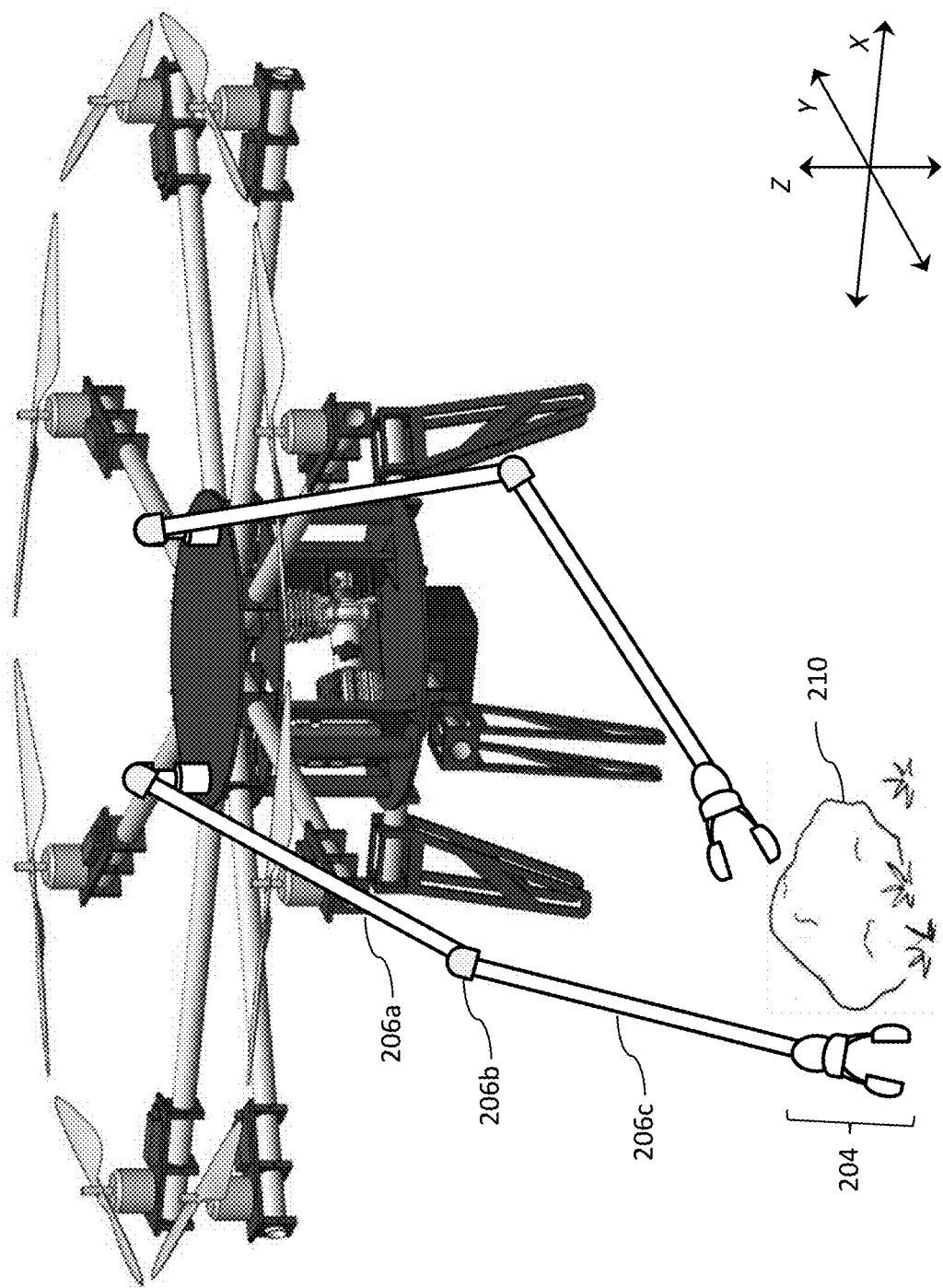

The UAV 100 may be equipped with a ground manipulation system 134 to yield an arm-equipped UAV 200, examples of which are illustrated in FIGS. 2a through 2c. Specifically, FIGS. 2a and 2b illustrate the arm-equipped UAV 200 with the ground manipulation system 134 in a stowed position (e.g., as the arm-equipped UAV 200 navigates to a waypoint) and an extended position, respectively, while FIG. 2c illustrates an arm-equipped UAV 200 with a set of two articulating arms 206. While the subject disclosure primarily describes ground fix devices and methods for a UAV 100 equipped with a ground manipulation systems 134, the disclosed ground fix devices and methods may be used with any UAV 100 having a payload where a stable landing and/or ground stability is desired. In one example, a vision system may necessitate a steady environment/landing to capture clear images. In another example, securely and firmly fixing the UAV 100 to the ground may be useful to dampen and/or suppress vibrations (or other forces) resulting from a payload usage; such as recoil, which can occur if the UAV 100 is equipped with a device designed to discharge projectiles or other material.

As illustrated, the ground manipulation system 134 may include a mounting structure 202, an articulating arm 206 (e.g., a robotic appendage or "robotic arm"), and an end-effector 204 to manipulate a target objective 210 (e.g., a workpiece, IED, etc.). The various hardware, such as the mounting structure 202, the end-effector 204, and the articulating arm 206, may be fabricated from one or more lightweight materials, including metals, metal alloys, plastics (e.g., 3d printed plastic), and/or composite materials.

The mounting structure 202 may be configured to pivot and rotate the articulating arm 206 relative to the airframe 102 (e.g., about an axis that is perpendicular to the X-Y plane—the z-axis) using, for example, one or more of a gimbal system, a U-shaped bracket, rails, and/or ball bearings. The mounting structure 202 may be sized and shaped to couple to an upper surface of the airframe 102.

The articulating arm 206 may be coupled at its proximal end to the mounting structure 202, while the end-effector 204 may be coupled to the distal end of the articulating arm 206. To enable movement in multiple degrees of freedom ("DOE") movement, the articulating arm 206 may comprise a plurality of arm segments 206a (whether linear, curved, or angled) joined end-to-end (as illustrated) using a plurality of hinged or pivotal joints 206b. A function of the articulating arm 206 is to increase the distance between the end-effector 204 and the airframe 102. To that, end, one or more arm segments 206a may employ a telescoping boom, which may employ an actuator assembly, such as a ball screw/nut assembly driven (e.g., adjusted in length) by an electric motor or other actuator.

The articulating arm 206, as well as other components of the ground manipulation system 134, may be controlled using one or more actuators. The actuators may be, for example, one or more of linear (straight line), rotary (circular), or oscillatory actuators, which may be driven (e.g., under the control of the aircraft processor 116, or a separate processor) through one or more of electrical, pneumatic, and/or hydraulic techniques. For example, the actuators may employ, for example, brushless DC back-driveable motors. The articulating arm 206 can be equipped with one or more encoders (e.g., an 18-bit single-revolution rotational encoder) for each of its degrees of freedom to ensure exact positioning of the articulating arm 206. In such a case, the aircrew processor 116 may determine the position or location of the end-effector 204 and the articulating arm 206 using the encoders. Internal clutches may be provided at each hinged or pivotal joint 206b to prevent damage to the articulating arm 206 in the event the articulating arm 206 is overloaded.

The end-effector 204 is the part of the ground manipulation system 134 that interacts with the target objective 210 and the environment. The end-effector 204 may be coupled to the articulating arm 206 via a multiple-DOF connection. The end-effector 204 may be configured to couple, or otherwise engage, for example, the target objective 210. For example, where the UAV 100 needs to pick up the target objective 210, a gripper may be employed as an end-effector 204. Where the UAV 100 must perform modification and/or manufacturing operations, the end-effector 204 may include tools such as brushes, cutting tools (e.g., saws and scissors), drills, sanders, screwdrivers, spray guns, and welding guns. The end-effector 204 may further include other devices to monitor the environment, such as anti-collision sensors, cameras, and other sensors, such as those to provide force and pressure detection. Suitable end-effectors 204 for manipulation, transportation, and emplacement of target objectives 210 include grippers, magnets, and vacuum cups.

While the arm-equipped UAV 200 can easily navigate to a waypoint, a problem, however, is that UAVs are limited by their battery capacity. Indeed, in addition to the power needed for flight, operating the ground manipulation system 134 can quickly deplete the arm-equipped UAV's 200 batteries. Therefore, arm-equipped UAVs 200 that operate using only battery power are significantly power constrained and, in some cases, can only offer only five to ten minutes of operation per charge. Therefore, to offer prolonged operation, a system is needed for supplying supplemental power to the arm-equipped UAV 200. One option for supplying supplemental power is to employ a tethered system, whereby a power cable (e.g., part of the tether) connects the arm-equipped UAV 200 with a remote power supply (e.g., at the remote resource 130). A tethered UAV, however, is limited in that the UAV is restricted by the length of the tether, which can become entangled in trees, structures, and other obstacles between the remote power supply and waypoint. An exemplary technique for handling longer tether in a UAV, however, is described by commonly owned U.S. Patent Publication No. 2016/0144958, which was filed May 19, 2014 and is titled "Tethered Aerial Systems for Data Gathering."

To obviate the need for a tether, auxiliary power may be provided to the arm-equipped UAV 200 via one or more secondary UAVs, such as the auxiliary power UAV 300 illustrated in FIG. 3. As can be appreciated, the auxiliary power UAV 300 shares a number of flight components with the UAV 100 of FIG. 1a and the arm-equipped UAV 200 of FIG. 2a (minus the ground manipulation system 134). The common flight components may include, for example, the airframe 102, the plurality of rotor booms 104, the plurality of propulsors 108 (each of which may be coupled to an ESC 106), and landing gear 110 (including its struts 112). The auxiliary power UAVs 300, however, further includes an auxiliary battery 302 to supply power to the arm-equipped UAV 200 (or another primary UAV) via a cable 304 and an electrical connector 306. The auxiliary battery 302 may be coupled to, and/or on, the airframe 102.

In certain aspects, the electrical connector 306 may employ a magnetic coupling to provide a rapid and reliable connection between the electrical connector 306 and a corresponding electrical connector 308 of the arm-equipped UAV 200. For example, the electrical connector 306 may employ a set of magnets 306a and a plurality of electrical pin connectors 306b (e.g., pogo pins). The set of magnets 306a may be configured to mate with a set of corresponding magnets on the electrical connector 308 of the arm-equipped UAV 200. To maintain correct pin alignment and to ensure correct polarity, each of the two magnets within a set of magnets 306a may be of opposite polarity such the electrical connector 306 can only mate with the electrical connector 308 in a particular orientation. The plurality of electrical pin connection 306b may be used to covey power and/or data to the arm-equipped UAV 200. For example, when four pins are used, the two outer two pins may be used to supply power (positive and neutral) from the auxiliary power UAVs 300 to the arm-equipped UAV 200, while the two inner two pins may be used to exchange data therebetween.

Figure 3B:
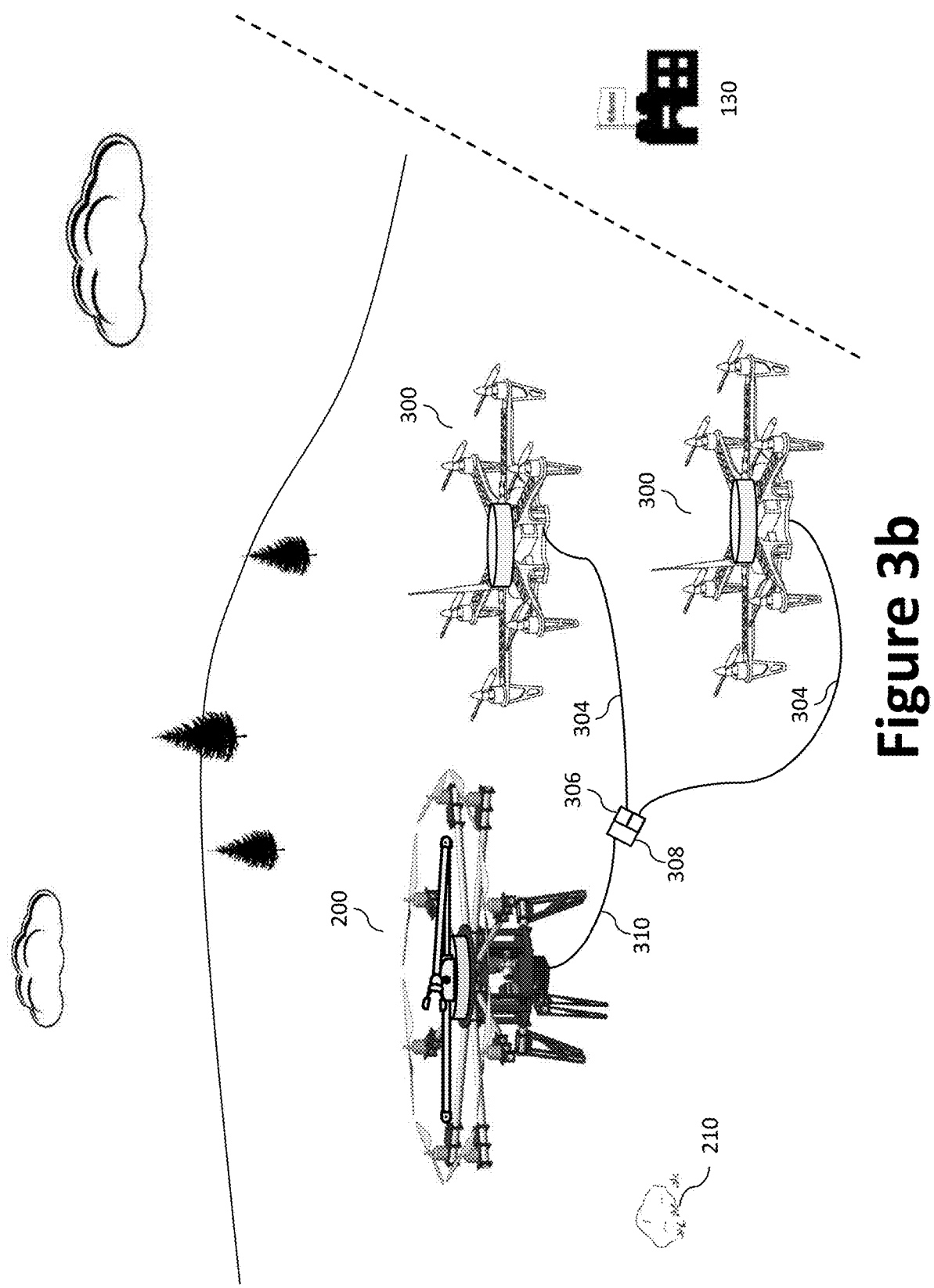

With reference to FIG. 3b, when an arm-equipped UAV 200 lands at a waypoint, one or more auxiliary power UAVs 300 may navigate to, and land at, the waypoint to supply auxiliary power. For example, the auxiliary power UAVs 300 can land adjacent the arm-equipped UAV 200 (e.g., within cable's 304 length) to provide additional power to the arm-equipped UAV 200 via cables 304 and one or more electrical connectors 306 and corresponding electrical connectors 308. As illustrated, while multiple electrical connectors 308 may be provided on the arm-equipped UAV 200, a cable 310 with a single electrical connector 308 may be configured to couple with multiple electrical connectors 306. In certain aspects, the cable 310 may be omitted and the electrical connector(s) 308 may be positioned on the airframe 102. In certain aspects, an array of UAVs may physically attach to the arm-equipped UAV 200 to provide additional functionality via a mesh structure. In certain aspects, one or both of the arm-equipped UAV 200 and the auxiliary power UAVs 300 may employ a hybrid system to provide additional power. An example hybrid system is described by commonly owned U.S. Patent Application No. 62/444,548, which was filed Jan. 10, 2017 and is titled "Vertical Lift by Series Hybrid-Propulsion."

To provide a continuation supply of auxiliary power to support longer missions, a tag team approach may be used with a plurality of auxiliary power UAVs 300 that travel between the waypoint and the remote resource 130. In a tag team approach, multiple auxiliary power UAVs 300 may be deployed, where one auxiliary power UAV 300 supplies power to the arm-equipped UAV 200 while the remaining auxiliary power UAVs 300 recharge their batteries (including their auxiliary battery 302) at the remote resource 130. As can be appreciated, the number of auxiliary power UAVs 300 needed in the tag team approach is a function of the operating time of the auxiliary power UAV 300 and the time needed to recharge the auxiliary power UAV 300. For example, if an auxiliary power UAV 300 can supply power for 15 minutes before needing to recharge its batteries, and a recharge takes 75 minutes, six (6) auxiliary power UAVs 300 would be needed for a continuous power supply operation, each with its own charging station at the remote resource 130. The charging stations may be contact charging station or contactless charging stations (e.g., employing one or more inductive charging techniques). The tag team approach offers the advantage (with proper schedule management) of having several auxiliary power UAVs 300 simultaneously available to perform parallel tasks.

Where the arm-equipped. UAV 200 is operated with access to sunlight (or other equivalent light), one or more solar panels may be installed on the arm-equipped UAV 200 or the auxiliary power UAVs 300 to extend battery life.

Exemplary solar aircraft configurations and techniques are described by commonly owned U.S. Patent Publication Nos. 2017/0331323, which was filed May 12, 2017 and is titled "Solar Power System and Method Thereof," and 2016/0311545, which was filed Apr. 21, 2016 and is titled "Solar-Powered Aircraft." In certain aspects, secondary UAVs may be used to deliver multiple solar panels to create a solar panel array.

In addition to addressing power needs, the arm-equipped UAV 200 may be fixed to a ground surface to facilitate ground-based robotic manipulation tasks. For purposes of this disclosure, the term "ground surface" is not limited to the earth, but rather refers to a stable and static mechanical ground surface, which may be sand, dirt, grass, glass, concrete, steel, marble-flooring, etc. As will be appreciated, certain of the following ground-fixing systems and techniques are better suited for specific types of ground surface. Moreover, while the ground surface is generally illustrated as a horizontal ground surface, any stable and static mechanical ground surface in any orientation could be used, such as a vertical wall or window near the target objectives 210; an example of which is described in connection with FIG. 14.

A number of ground-fixing systems and techniques for securing a UAV 100 (e.g., the arm-equipped UAV 200 and the auxiliary power UAVs 300) to the ground are disclosed. The ground-fixing techniques include, inter alia, selectively controlling the plurality of propulsors 108 to generate a force that pushes the UAV 100 against (toward) the ground surface, increasing the weight of the UAV 100 upon landing (i.e., once on the ground), and physically attaching the UAV 100 to a ground surface using one or more attachment devices (e.g., via its struts 112).

Figure 4:
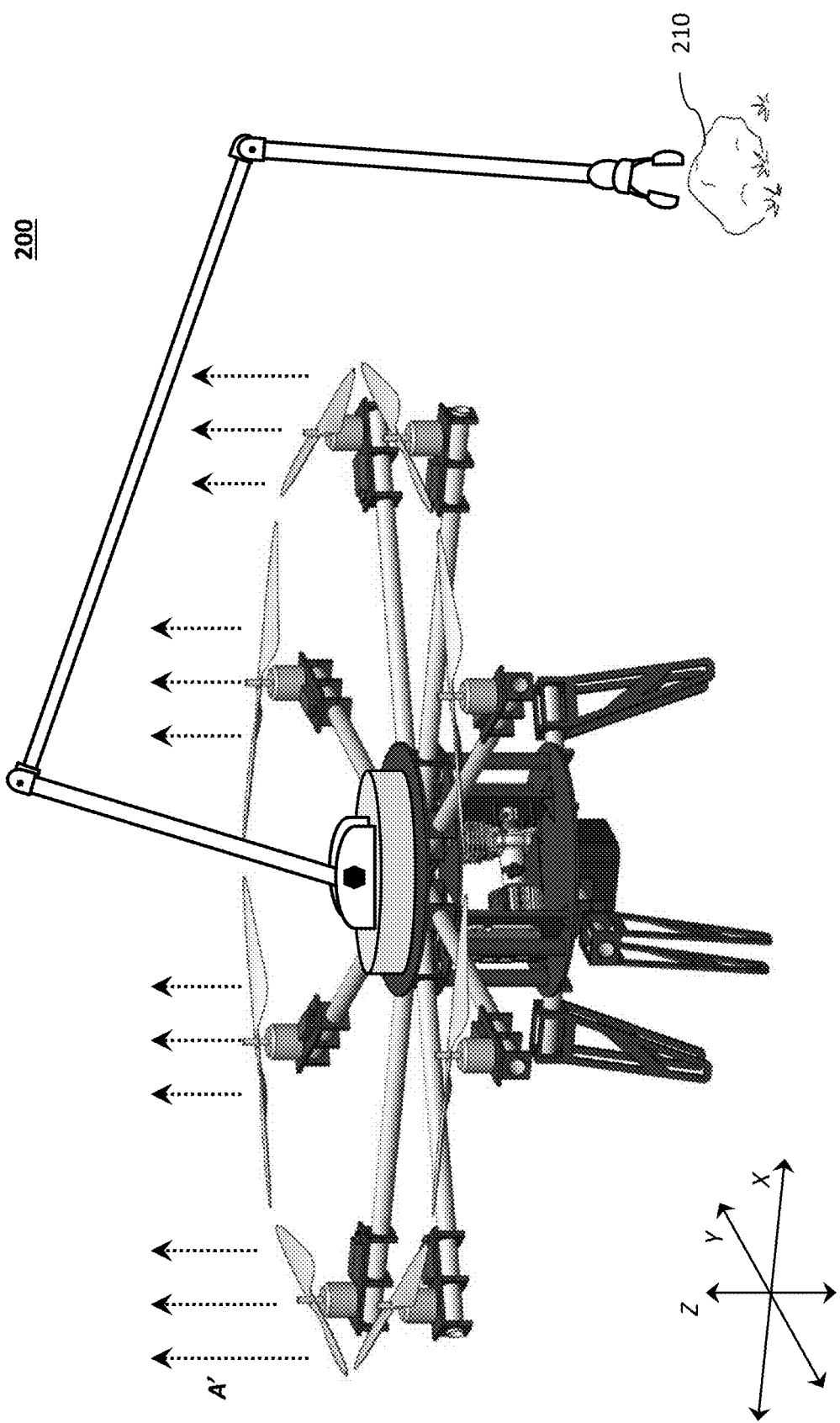
FIG. 4 illustrated a thrust-fixing approach for fixing an aircraft to a ground surface.

With reference to FIG. 4, the aircraft processor 116 may instruct one or more of the plurality of propulsors 108 to generate an upward thrust (i.e., in direction A'). That is, if each of the plurality of propellers 108b rotates clockwise during flight, the plurality of propellers 108b may be driven counter-clockwise to secure the UAV 100 against the ground surface. In certain aspects, the plurality of propulsors 108 may be driven as a function of the force imparted on the ground manipulation system 134 (e.g., by the target objective 210) to counter balance the weight thereof. The thrust-fixing approach of FIG. 4a may be employed with virtually any type of ground surface 506.

As noted above, UGVs exploit their comparatively large mass to generate increased friction force with the ground. For a fixed coefficient of friction, increased mass results in an increased holding force. Where a UAV 100 must remain relatively lightweight, increasing the weight of the UAV 100 (e.g., the arm-equipped UAV 200) upon landing may be accomplishing using a secondary UAV 508 (e.g., the auxiliary power UAVs 300). In other words, the secondary UAV 508 may deliver additional mass to supplement the UAV 100. The increased mass approach may be employed with virtually any type of ground surface 506.

With reference to FIGS. 5a through 5d, the UAV 500 may be provided with a flexible landing strip 502 that unrolls from the UAV 500 to provide a landing area on the ground surface 506 for the one or more secondary UAVs 508. When not in use, the landing strip 502 may be rolled about a spindle mechanism 504 secured to the UAV 500. The spindle mechanism 504 may be configured to secure the landing strip 502 to the UAV 500, whereby the spindle mechanism 504 can be disengaged upon landing at the waypoint to release (e.g., uncoil) the landing strip 502. Specifically, FIG. 5a illustrates the landing strip 502 in a rolled and stowed configuration, while FIG. 5b illustrates the landing strip 502 as released from the UAV 500, but not yet in a deployed configuration. FIG. 5c illustrates the landing strip 502 in an unloaded deployed configuration, while FIG. 5d illustrates the landing strip 502 in a deployed configuration and loaded with a secondary UAV 508. When the secondary UAV 508 is an auxiliary power UAV 300, the auxiliary power UAVs 300 may also supply power (or other functionality) to the UAV 500 via one or more electrical connectors 306.

The landing strip 502 may be formed from a flexible material, such as plastic, polyvinyl chloride (PVC), nylon, urethane, etc. For example, the landing strip 502 may be configured as a rollable mat of flexible material. In one aspect, the landing strip 502 may be formed from two sheets of material cut to a quadrilateral shape that are fused (or otherwise sealed) to one another at all four sides to form an interior cavity. An gas inlet may be provided on the landing strip 502 adjacent the UAV 500 to allow the interior cavity to be filled with gas (e.g., air or a non-explosive, inert gas, such as Nitrogen, carbon dioxide ($CO_2$), or a combination thereof). To unroll the landing strip 502 upon landing, air may be introduced to the landing strip 502 to thereby inflate and unroll the landing strip 502, The gas may be supplied by an air pump, or a chemical reaction (e.g., a heating element ignites a chemical explosive), or a pressurized cylinder filled with gas. The chemical explosive may include a propellant combination of nitroguanidine, phase-stabilized ammonium nitrate ($NH_4NO_3$) or other nonmetallic oxidizer, and a nitrogen-rich fuel (e.g., sodium azide, tetrazoles, triazoles, and their salts). In another aspect, the longitudinal edges of the landing strip 502 may include an embedded semi-ridge wire that can be rolled into a coil when the landing strip 502 is stowed and secured, but reverts to an uncoil state when release to unroll the landing strip 502. In certain aspects, the landing strip may be released and deployed prior to landing (e.g., when the UAV is a about 1 meter above the ground), so that the motion of landing helps unroll/unfold the landing strip 502. Where the UAV is equipped with a robotic arm (e.g., the ground manipulation system 114), the robotic arm may serve to help deploy (open/unroll/unfold) the landing strip 502, which may allow for better (e.g., more compact/secured) packaging during flight. The landing strip 502 may be coupled to the UAV through actuators so that, once the mission is complete, the landing strip 502 may be released, discarded, and left behind. Rather than actuators, the landing strip 502 may be coupled to the UAV through one or more frangible components that may be broken to detach the landing strip 502. The robotic arm may also be used to assist with detaching the landing strip 502. Additionally, the robotic arm may be able to dig around the area surrounding the UAV and transport material to add mass to the landing strip 502. For example, if the UAV lands on sand, dirt, or another loose material, the robotic arm may transport material from the ground to the landing strip 502.

In lieu of the landing strip 502, one or more secondary UAVs 508 may be configured to add mass to the UAV 500 by landing on the UAV 500, whether directly on top or on a structure coupled thereto. With reference to FIGS. 6a and 6b, for example, a UAV 600 may be provided with one or more support structures 602 to support placement of additional mass. As illustrated, the support structure(s) 602 may be a generally planar structure that extends radially from the airframe 102. For example, the one or more support structures 602 may enable one or more secondary UAVs 508 to add mass to the UAV 600 by landing on the support structure 602 or to releasing (lowering) weights onto the support structure 602. For example, as illustrated in FIG. 6b, a secondary UAV 508 may be provided with a winch 608 to lower a weight 606 (or battery pack) onto the support structure 602 via a lead line 604. In another aspect, the secondary UAV 508 may simply land on the support structure 602, in which case the secondary UAV 508 may also supply power to the UAV 600. The support structure 602 is conceptually similar to the above-described landing strip 502, except that it is made of rigid links or sheets. Thus, the support structure 602 may be configured to unfold through rotation around hinges, rather than unroll. The support structure 602 could unfold, being hinged at the legs. The support structure 602 would be installed with springs or by using gravity such that a single trigger mechanism would cause the structure to unfold.

Figure 7A:
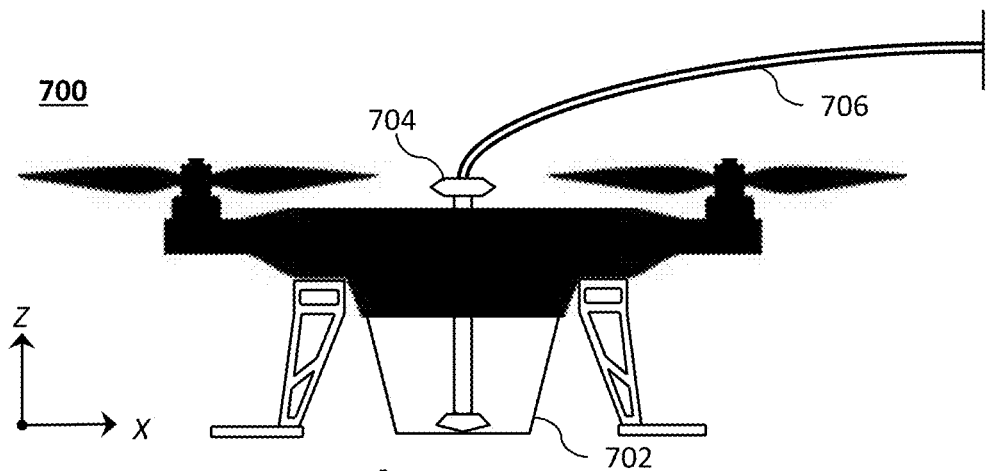
FIGS. 7a through 7c illustrate an aircraft equipped with an example reservoir.
Figure 7B:
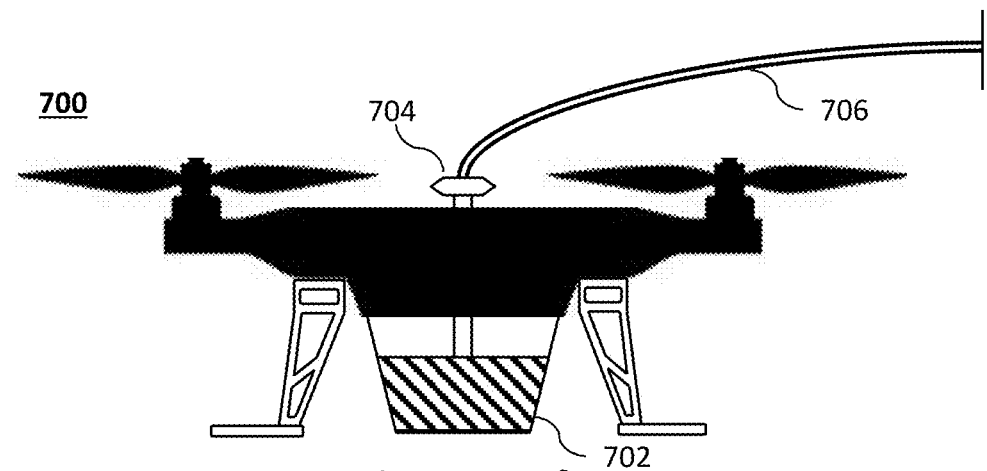
Figure 7C:
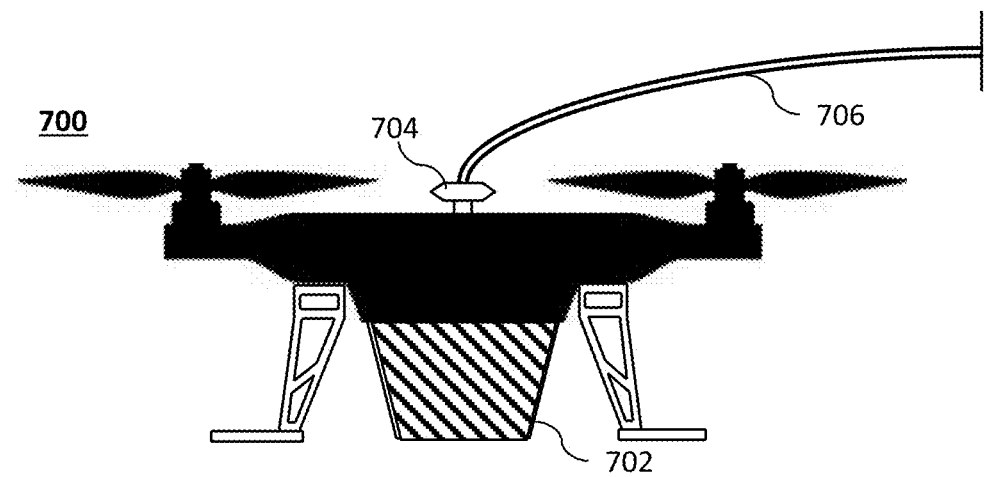
Figures 8A, 8B, 8C, 8D:
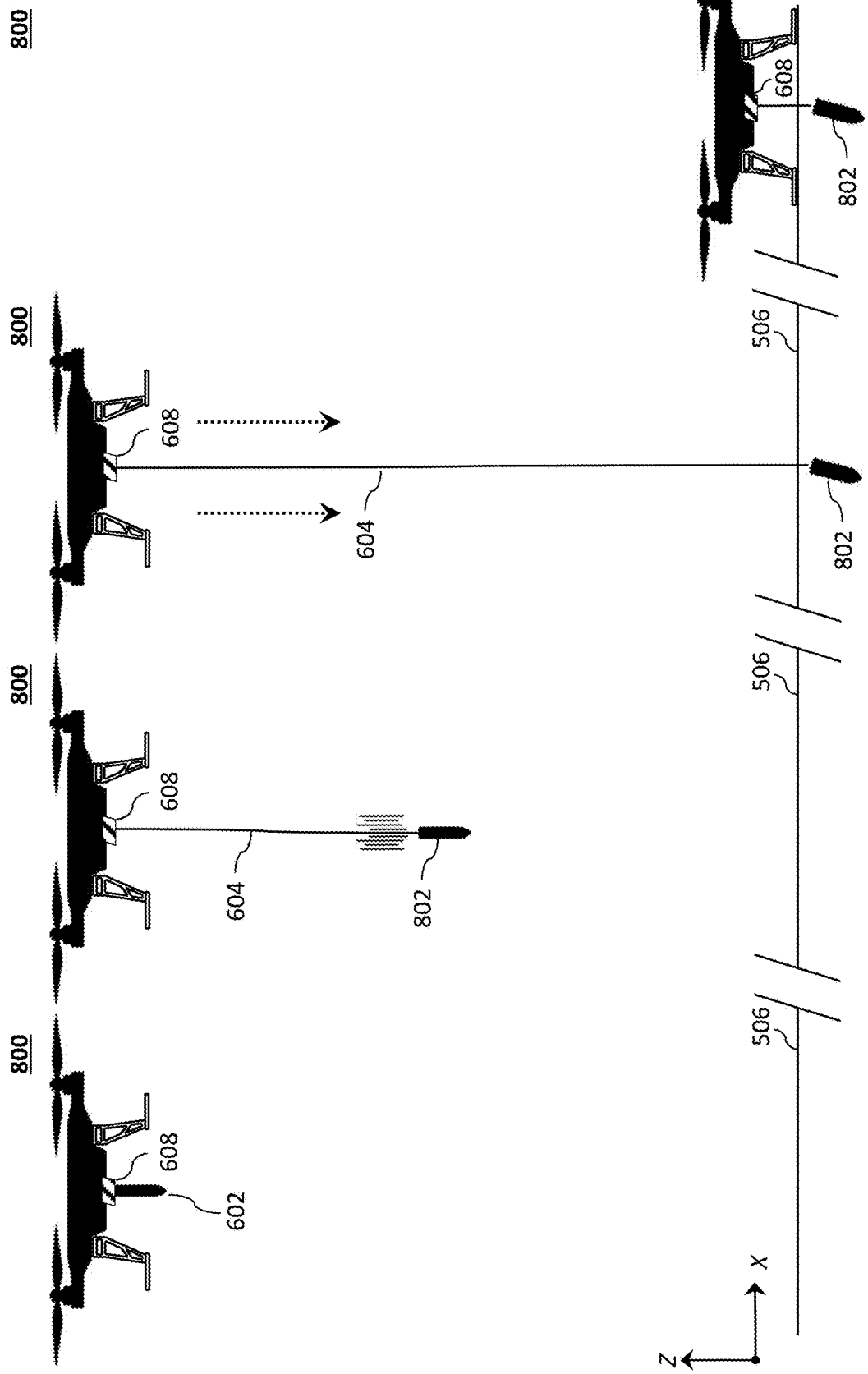
FIGS. 8a through 8d illustrate an aircraft equipped with an example anchor.

With reference to FIGS. 7a through 7c, a UAV 700 may be provided with a reservoir 702 to house a fluid or a particulate (e.g., sand, gravel, etc.). For example, a filler neck 704 to fluidly couple with the reservoir 702 may pass from the top surface of the airframe 102, through the UAV 700 (e.g., the airframe 102), and terminate at the reservoir 702. Specifically, FIG. 7a illustrates the UAV 700 with an empty reservoir 702, while FIGS. 7b and 7c illustrate, respectively, the UAV 700 with a partially filled reservoir 702 and a filled reservoir 702. The reservoir 702 may be formed as a rigid reservoir or a flexible bladder reservoir. The reservoir 702 may be filled with fluid by a pump positioned on the UAV 700 or by a secondary UAV 508. For example, the pump may draw fluid (e.g., from a nearby water source) via a hose 706 coupled to the filler neck 704 until the reservoir 702 is full. Alternatively, one or more secondary UAVs 508 may add mass to the UAV 700 by filling the reservoir 702 via the hose 706 and the filler neck 704 with a fluid or a particulate. As can be appreciate, when a flexible bladder reservoir is used, the flexible bladder reservoir may be folded in to very small package prior to being filled with fluid. As with the landing strip 502, the reservoir 702 may be coupled to the UAV through one or more actuators and/or frangible components, which may be actuated or broken to detach the reservoir 702 from the UAV. The robotic arm may also be used to assist with detaching the reservoir 702. Accordingly, once the mission is complete, the reservoir 702 may be released, discarded, and left behind.

Where a UAV 100 must remain relatively lightweight and increasing the weight of the UAV 100 (e.g., the arm-equipped UAV 200) upon landing is not feasible or desired, the UAV 100 may be configured to physically attach the ground surface 506. For example, the UAV 100 may anchor to the ground surface 506 via a cable and/or one or more of the struts 112 (or other components of the landing gear 110) may be provided with a ground-fixing mechanism.

With reference to FIGS. 8a through 8d, a UAV 800 may be configured to drop, or propel, an anchor 802 into the ground surface 506. The anchor 802 may be, for example, a sharp weight to be dropped from a predetermined height such that it penetrates and lodges into the ground surface 506. In certain aspects, the anchor 802 may be propelled to the ground surface 506 using, for example, a spring or an explosive to propel the anchor 802 toward the ground surface 506. As illustrated, the anchor 802 may be coupled to a winch 608 positioned on the UAV 800 via a lead line 604 (e.g., a rope, cable, wire, cord, line, string, twine, etc.). Once the anchor 802 has become lodged in the ground surface 506, the winch 608 may be activated to winch the lead line 604 as the UAV 800 land at (e.g., on top of) the anchor 802. The winch 608 also serves to navigate the UAV 800 to the ground surface 506. To ensure that the UAV 800 is securely fixed to the ground surface 506, the winch 608 may be driven until the portion of the lead line 604 between the airframe 102 and the ground surface 506 is taught. To release the anchor 802, an actuator may be actuated to decouple the anchor 802 (or lead line 604). In another example, the winch 608 may be overdriven until the UAV 800 breaks free from the anchor 802 (e.g., via a frangible link in the lead line 604 or at the coupling to the anchor 802). The anchor approach is well-suited for ground surfaces 506 that are semi-solid, such as dirt, sand, etc.

With reference to FIGS. 9a and 9b, the ground-fixing mechanism may employ a screwing technique to couple the UAV to a ground surface 506. For example, one or more of the struts 112 may be provided with a screw 910 that may be driven into the ground surface 506 by an electric motor (or other actuator). More specifically, the struts 112 may be provided with a ground contact plates 902 to support the screw-driving assembly 914. The screw-driving assembly 914 may be coupled to the aircraft control system 114 and/or a power supply via the cable 912, which may be used to selectively supply power to the screw-driving assembly 914. Specifically, FIG. 9a illustrates the screw-driving assembly 914 in the disengaged position (i.e., where the strut 112 is not secured to the ground surface 506), while FIG. 9b illustrates the screw-driving assembly 914 in the engaged position (i.e., where the strut 112 is secured to the ground surface 506).

As illustrated, the screw-driving assembly 914 generally comprises an upper driving mechanism 904, a lower driving mechanism 906, a set of guide shafts 908, and a screw 910. The upper driving mechanism 904 and the lower driving mechanism 906 may be coupled to one another by the set of guide shafts 908. For example, the set of guide shafts 908 may be fixedly coupled with the lower driving mechanism 906 and slideably coupled with the upper driving mechanism 904 to guide the upper driving mechanism 904 toward the lower driving mechanism 906 during operation.

The upper driving mechanism 904 may include a motor and gearing to rotate the screw 910 (e.g., coupled to the head of the screw 910) relative to the upper and lower driving mechanisms 904, 906. The screw 910 may be threadably engaged with the lower driving mechanism 906, thereby causing the screw 910 to travel in direction A (toward the ground surface 506) as it is rotated. As the screw 910 rotates, it passes through an opening (e.g., a hole) in the ground contact plate 902 and into the ground surface 506. As can be appreciated, as the screw 910 rotates, the upper driving mechanism 904 slides downward along the guide shafts 908 until it encounters the lower driving mechanism 906. To prevent the electric motor from being overdriven, a current sensor may be provided to measure current in the cable 912. Upon hitting a predetermine current threshold limit (as measure by the current sensor), which indicates that the screw 910 has traversed to its terminal end, the aircraft processor 116 may cut of power to the electric motor. The electric motor may be driven in reverse to disengage the screw-driving assembly 914 while in the engaged position, thereby unscrewing the screw 910 from the ground surface 506. In another aspect, the frangible link may be provided such that the motor can be over driven (e.g., beyond the predetermine current threshold limit) until the a frangible link of screw-driving assembly 914 snaps/breaks. In certain aspects, the screw-driving assembly 914, or other component (e.g., the screw 910) may be replaceable, thereby enabling the operator to replace the screw 910 as it becomes dull or to replace it and a broken frangible link. The screwing approach is well-suited for ground surfaces 506 that are semi-solid, such as dirt, sand, etc., or, depending on the type of screw 910, solid (e.g., cement, brick, etc.).

With reference to FIG. 10, the ground-fixing mechanism may employ electro-magnet techniques to couple the UAV to a ground surface 506. For example, one or more of the struts 112 may be provided with an electro-magnet 1002 on, or in, the ground contact plates 902. While FIG. 10 illustrates a ground contact plate 902, the electro-magnet 1002 may be coupled directly to the strut(s) 112, thereby obviating the need for ground contact plates 902. The electro-magnet 1002 may be coupled to the aircraft control system 114 and/or a power supply via the cable 912, which may be used to selectively supply power to the electro-magnet 1002, thereby selectively engaging/disengaging the electro-magnet 1002. Electro-magnets are designed for a specific holding force and, therefore can be affixed to ferrous surfaces, but can consume significant electrical power. Therefore, an auxiliary power UAVs 300 may be coupled to the UAV to supply additional power. The electro-magnet approach is well-suited for ground surfaces 506 that are ferrous, such as iron, steel, etc. (such as a vehicle, whether a land, air, or sea vehicle). Where an electro-magnet is undesirable or unnecessary (as the case may be in sacrificial/one-time-use UAVs), a permanent magnet may be used, such as rare-earth magnets (e.g., a neodymium (NdFeB) magnet).

With reference to FIG. 11, the ground-fixing mechanism may employ bonding material techniques to couple the UAV to a ground surface 506. As illustrated, the ground contacting surface of the ground contact plates 902 (i.e., the underside) may be lined with a bonding material 1102 to form a bond with the ground surface 506. Suitable bonding materials 1102 include, for example, suction cups (whether passive or active via a pump), adhesives, and bio-inspired devices, such as the bio-inspired device described by U.S. Pat. No. 7,762,362 to Mark R. Cutkosky and titled "Climbing with Dry Adhesives." The bonding material approach is well-suited for ground surfaces 506 that are clean and non-porous, such as polished stone, glass, steel, painted surfaces (such as a vehicle), etc.

In another aspect, the ground-fixing mechanism may employ clamping techniques to couple the UAV to a ground surface 506. As illustrated in FIGS. 12a, 12b, 13a, and 13b, for example, the UAV may be provided with actuating legs that clamp the UAV to a protruding feature 1210 from the ground surface 506. The clamping approach is well-suited for ground surfaces 506 that non-flat and including one or more protrusions (e.g., rocks, tree stumps, etc.).

Figures 12A, 13A:
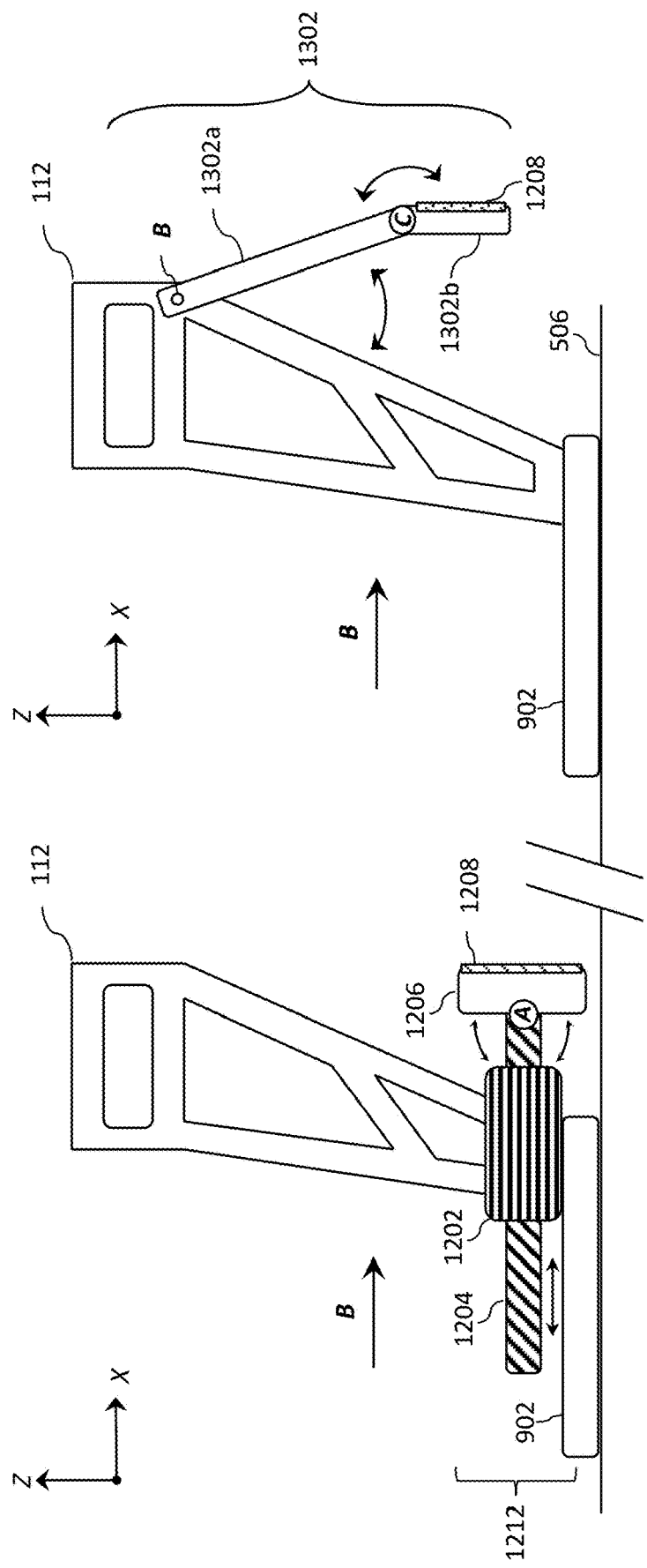
FIGS. 12a and 12b illustrate an aircraft equipped with a first example clamping assembly.
FIGS. 13a and 13b illustrate an aircraft equipped with a second example clamping assembly.
Figure 12B:
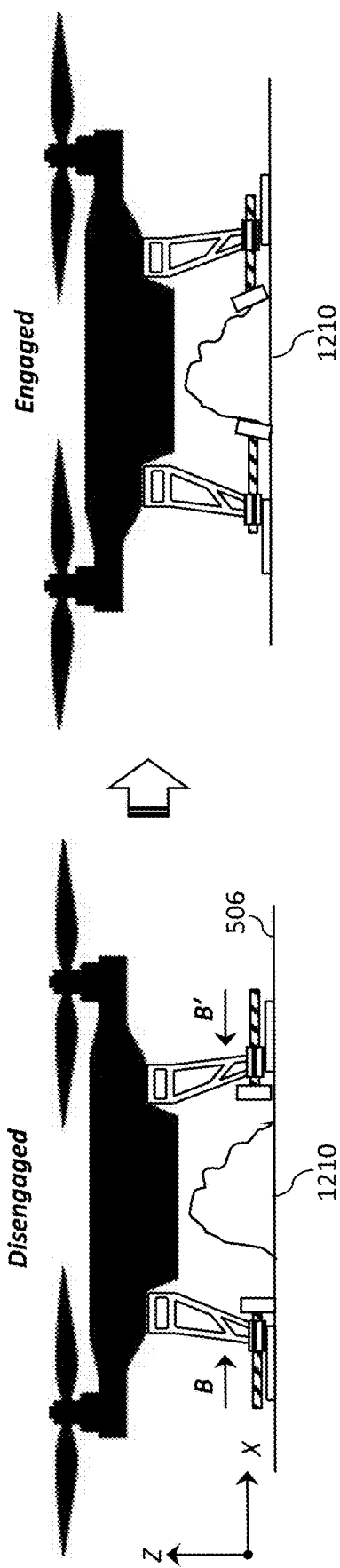

With reference to FIGS. 12a and 12b, a first clamping technique is illustrated as an actuating leg with a laterally displaceable gripping device 1212. Specifically, the struts 112 may be provided with a laterally displaceable gripping device 1212 having a rod-driving actuator 1202 and a threaded rod 1204 with a foot 1206 pivotally attached to a distal end of the threaded rod 1204 (e.g., at pivot point A). The foot 1206 may further comprise a gripping material 1208 at the feature-contacting surface of the foot 1206 to increase reduce friction with, and conform to, the surface of the protruding feature 1210. The threaded rod 1204 may be laterally displaced via a rod-driving actuator 1202. The rod-driving actuator 1202 may include an electric motor and gearing to engage the threads of the threaded rod 1204 (e.g., in a worm gear arrangement). The rod-driving actuator's 1202 electric motor may be coupled to the aircraft control system 114 and/or a power supply via a cable 912, which may be used to selectively supply power to the rod-driving actuator's 1202 electric motor.

With reference to FIG. 12b, the UAV is illustrated with the laterally displaceable gripping device 1212 in a disengaged position (left) and an engaged position (right). Note that, in the engaged position, the laterally displaceable gripping devices 1212 are driven toward the protruding feature 1210 until contact is made to clamp the UAV to the protruding feature 1210. Further, the foot 1206 pivots to conform to the angle of surface of the protruding feature 1210, while the gripping material 1208 conforms to the shape/texture of the protruding feature 1210. In another aspect, the threaded rod 1204 may be driven using the arrangement described with regard to the screw-driving assembly 914, but rotated by 90 degrees.

Figure 13B:
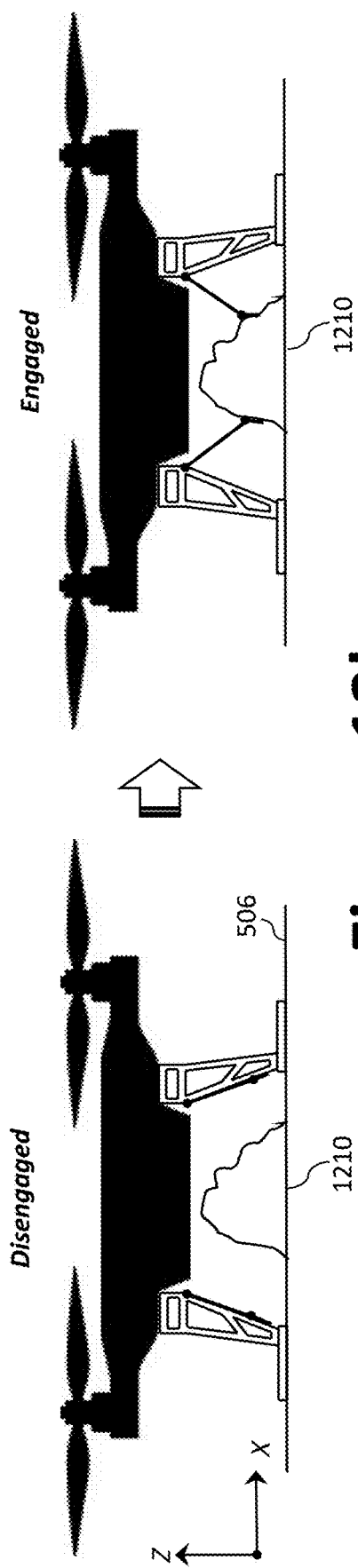

With reference to FIGS. 13a and 13b, a second clamping technique is illustrated as an actuating leg with a pivotally displaceable gripping device. Specifically, the struts 112 may be provided with pivoting arm 1302 having a first portion 1302a pivotally coupled (pivot point B) to the strut 112 at a proximal end, and a second portion 1302b pivotally coupled (pivot point C) at its proximal end to the distal end of the first portion 1302a. The first and second portions 1302a, 1302b may be linear (as illustrated), curved, or angled. The second portion 1302b may further comprise a gripping material 1208 at the feature-contacting surface of the second portion 1302b (e.g., at a side of the second portion 1302b) to increase friction with, and conform to, the surface of the protruding feature 1210. The pivoting arm 1302 may be configured to pivot at pivot points B and C using, for example, one or more actuators.

With reference to FIG. 13b, the UAV is illustrated with the pivotally displaceable gripping device in a disengaged position (left) and an engaged position (right). Note that, in the engaged positioned, each pivoting arm 1302 pivots toward the protruding feature 1210 until contact is made to clamp the UAV to the protruding feature 1210. Further, the second portion 1302b pivots relative to the first portion 1302a to, together with the gripping material 1208, conform to the angle/surface of the protruding feature 1210.

Figure 14:
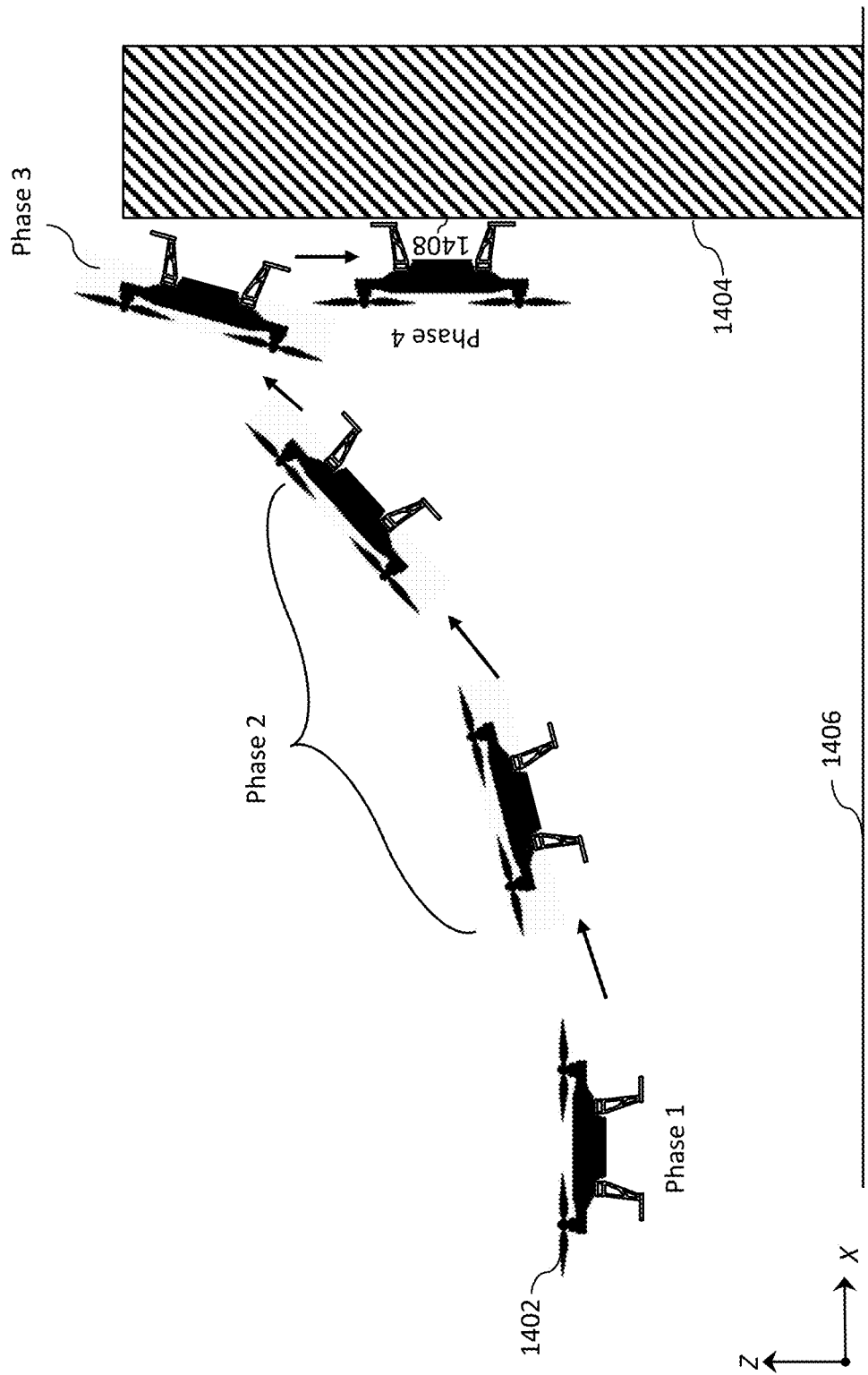
FIG. 14 illustrates a UAV performing a vertical landing maneuver to affix to a vertical surface.

While the subject disclosure primarily describes ground fix devices and methods for a UAV 100 on horizontal ground, as noted above, the ground fixing mechanism need not be limited to relatively horizontal surface. FIG. 14, for example, illustrates a UAV 1402 performing a vertical landing maneuver to affix to a vertical surface 1404. As illustrated in FIG. 14, the UAV pitches up near the target and affixes to the vertical surface 1404. The vertical landing maneuver may be generally divided into four phases. During Phase 1, the UAV 1402 generates a balanced thrust to fly parallel to the ground surface 1406. Phase 1 is, in effect, a normal flight mode. During Phase 2, as the UAV 1402 approaches the vertical surface 1404, the UAV 1402 pitches upward toward the vertical surface 1404 until the UAV 1402 is nearly perpendicular to the ground surface 1406. At Phase 3, the UAV 1402 is nearly perpendicular to the ground surface 1406 and effectively enters a stall mode, at which point the UAV 1402 begins to drop downward (lose altitude) toward the target landing area 1408. At phase 4, the UAV 1402 is orientated with its landing gear against the wall 1404 at the target landing area 1408. A shock-absorbent apparatus may be employed by the UAV 1402 to absorb shock at contact with the target landing area 1408, such as the robot-legged landing gear 1610 discussed in connection with the robot-legged UAV 1608 (below). The robot-legged landing gear 1610 could be used to sense force and conform to the surface, if necessary. Once the UAV 1402 is orientated with its landing gear against the wall 1404, the same affixing mechanisms disclosed are applicable here as well. For example, if the wall is a building with a smooth surface (e.g., glass, metal, etc.), the bonding material technique may employ suction cups, bio-inspired devices, etc. While the vertical surface 1404 is illustrated as perpendicular to the ground surface 1406, any inclined surface (at a negative or positive degree) could work as well.

Figure 15A:
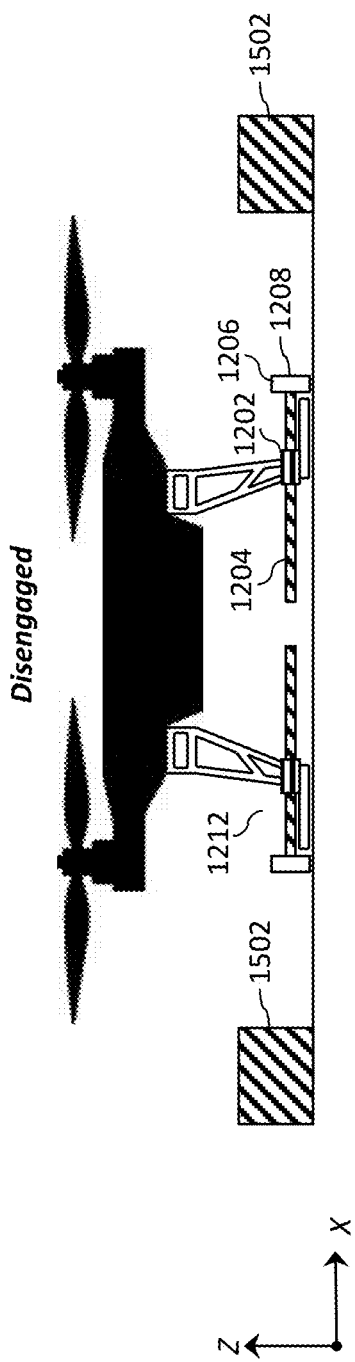
FIGS. 15a and 15b illustrate a laterally displaceable gripping device configured to push outward to secure the UAV between two fixed objects.
Figure 15B:
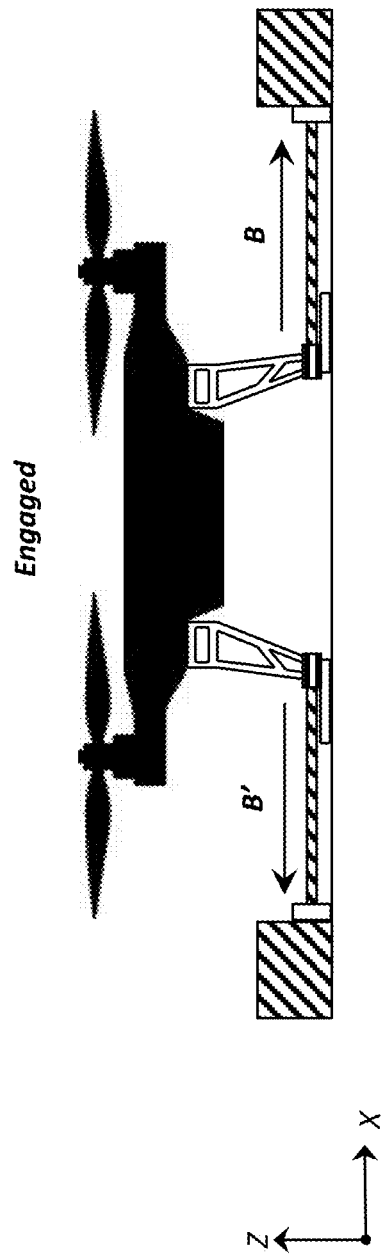

With reference to FIGS. 15a and 15b, the laterally displaceable gripping device 1212 may be configured with a foot 1206 on the outer end of each threaded rod 1204 such that the laterally displaceable gripping device 1212 are configured to push outward to secure the UAV between two fixed objects 1502. With reference to FIG. 15a, the UAV is illustrated with the laterally displaceable gripping device 1212 in a disengaged position. While FIG. 15b illustrates the laterally displaceable gripping device 1212 in an engaged position. Note that, in the engaged position, the laterally displaceable gripping devices 1212 are driven away from the UAV and toward the two fixed objects 15 until contact is made to clamp the UAV between the two fixed objects 1502. The foot 1206 may pivot to conform to the angle of surface of each fixed object 1502, while the gripping material 1208 conforms to the shape/texture of the fixed object 1502. This arrangement may be useful in instances where the UAV lands between the two fixed objects 1502, such as two nearby enclosure walls in an alleyway. In certain aspects, each threaded rod 1204 may include a foot 1206 at each end, thereby along the UAV to clamp (FIG. 12b) and push outward (FIG. 15b).

Figure 16A:
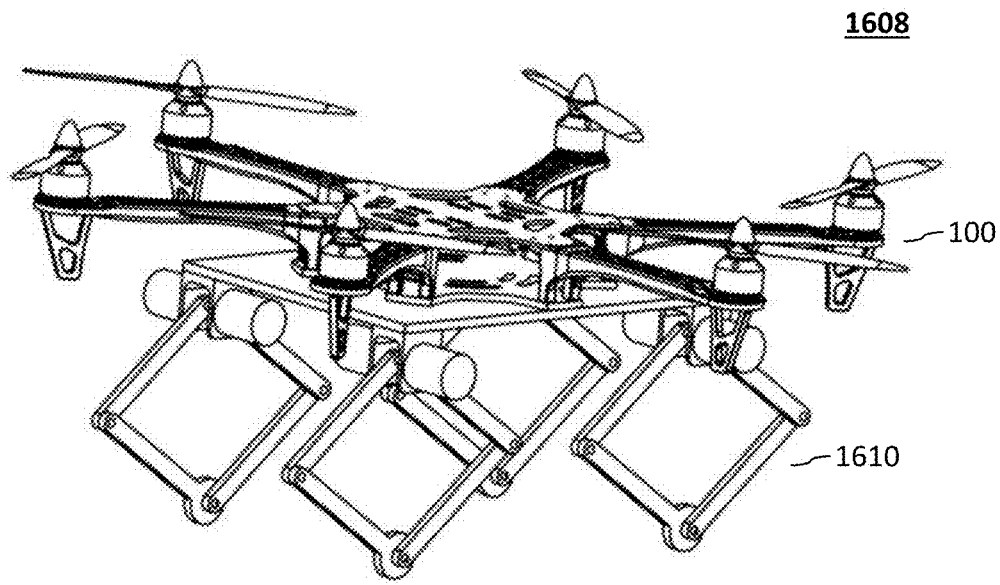
FIG. 16a illustrates an example robot-legged UAV.

FIG. 16a illustrates an example robot-legged UAV 1608, which is generally a UAV 100 equipped with robot-legged landing gear 1610. As illustrated, the robot-legged landing gear 1610 effectively replaces conventional passive aircraft landing gear with actuated robot legs. The robot-legged landing gear 1610 enables control of both the configuration and dynamic response of contact between the UAV 100 and the ground (or other structure), which significantly increases the types of landings that can be performed by helicopters and other VTOL, aircraft. Each of the legs of the robot-legged landing gear 1610 may be controlled independently to conform to the terrain/landing area.

Figure 16B:
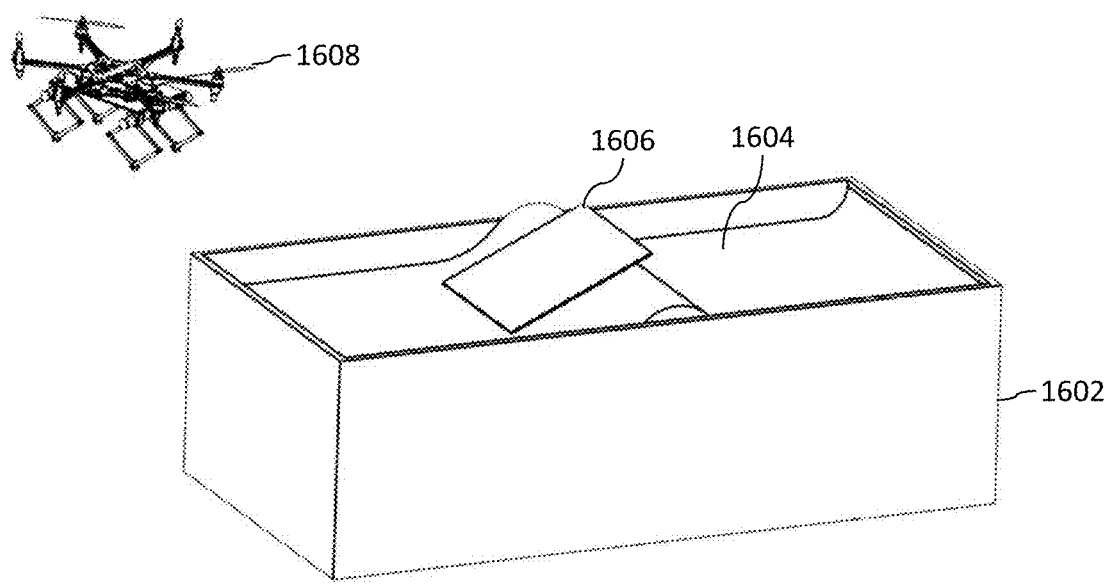
FIG. 16b illustrates robot-legged UAV on approach to a landing platform floating in a fluid.

FIG. 16b illustrates robot-legged UAV 1608 on approach to a landing platform 1606 floating in a wave-pool 1602 filled with fluid 1604 (e.g., water), which simulates a rough-sea landing. The robot-legged UAV 1608 offers certain advantaged. For example, the robot-legged UAV 1608 can verify surface integrity when landing on new terrain, land on a relatively small platform (e.g., the landing platform 1606, which is sized to match the dimensions of the UAV 100) in rough seas, and land with high-speed and high maneuverable. The robot-legged landing gear 1610 may measure ground stability before fully landing a UAV. For example, on an initial vision-based survey of new terrain, a UAV may not easily differentiate safe ground from dangerous marshland. The robot-legged landing gear 1610, however, could quickly measure ground stiffness during initial interaction with the ground, and through the contact event, to verify ground integrity or call off the landing. As can be appreciated, landing a UAV on a choppy water-based platform (e.g., the landing platform 1606) presents kinematic and dynamic challenges created by the highly variable floating base dynamics, and increased mission risk due to the water environment. The robot-legged UAV 1608, however, offers sea-landing capabilities through the robot-legged landing gear 1610. Further, the robot-legged landing gear 1610 enables state UAV landings at higher entry velocity by providing active shock absorption, which could enable faster missions in many operational scenarios. This may include the development of "hop landing" techniques that remove vehicle kinetic energy over multiple steps, in vertical, horizontal, or lateral planes.

In certain aspects, the controller (e.g., flight controller 120 and/or aircraft processor 116) may be configured to adjust thrust from the propulsors 108 to maintain the UAV balances/stabled to the landing surface, especially in the case of water landing. A ground fixing can be stabilized (stay parallel to gravity) when individual propulsors 108 are controlled to generate thrust in case of unbalanced landing surface (e.g., the landing platform 1606). When a UAV is fixed to a platform that is not stable; however, the UAV can balance itself by individually controlling the thrust level of the propulsors 108. This can, among other things, prevent tip over. An imbalance can be sensed with a gyro sensor, accelerometer, and/or gyroscope-enabled indicator (such as an attitude indicator, gyro horizon, artificial horizon). The robot-legged UAV 1608 may also employ sensor inputs from other onboard systems, such as the GPS 124a (e.g., DGPS), INS 124b, the MTV 124c, and sensors to sense pitch, yaw, roll, and acceleration (e.g., gyroscopes, accelerometers, magnetometers, etc.). Therefore, the robot-legged landing gear 1610 can be used to balance the UAV at an unbalanced or an unstable surface (i.e., platform on water, vibration environment—such as, a moving aircraft, trains, ground vehicles, etc.).

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. An aircraft for providing ground manipulation of a target objective at a ground surface, the aircraft comprising:
   an airframe;
   a plurality of rigid struts configured to support the airframe when the aircraft is on the ground surface;
   a plurality of rotor booms extending radially from the airframe;
   a plurality of propulsors, each of said plurality of propulsors positioned at a distal end of one of said plurality of rotor booms, wherein the plurality of propulsor are configured to be controlled by an aircraft processor;
   an articulating arm coupled at its proximal end to the airframe;
   an end-effector coupled to a distal end of the articulating arm configured to engage the target objective; and
   a ground-fixing system coupled to at least one of the plurality of rigid struts and configured to secure the airframe relative to the ground surface, wherein the ground-fixing system includes two or more laterally displaceable gripping devices configured to clamp onto a protruding feature of the ground surface.

2. The aircraft of claim 1, wherein the aircraft is configured to charge via a second aircraft.

3. The aircraft of claim 1, wherein each of the two or more laterally displaceable gripping devices a rod-driving actuator and a threaded rod having a foot pivotally attached thereto.

4. The aircraft of claim 3, wherein the foot includes a gripping material to increase friction with, or conform to, a surface of the protruding feature.

5. The aircraft of claim 1, wherein the ground-fixing system is configured to assess ground stability of the ground surface via a robotic leg before landing the aircraft on the ground surface.

6. The aircraft of claim 1, wherein the ground-fixing system is configured to provide feedback data relating to the ground surface.

7. The aircraft of claim 6, wherein the ground-fixing system comprises a vision system that is configured to generate feedback data, wherein the vision system is coupled to the articulating arm or the end effector.

8. The aircraft of claim 1, further comprising an intelligence, surveillance, and reconnaissance (ISR) payload configured to provide ISR data relating to the ground surface before landing the aircraft on the ground surface.

9. An unmanned aircraft for providing ground manipulation of a target objective at a ground surface, the unmanned aircraft comprising:
   an airframe;
   a plurality of rigid struts configured to support the airframe when the aircraft is on the ground surface;
   a plurality of rotor booms extending radially from the airframe, wherein each of the plurality of rotor booms includes a propulsor;
   an aircraft control system configured to navigate and land the unmanned aircraft at the ground surface;
   an articulating arm coupled at its proximal end to the airframe;
   an end-effector coupled to a distal end of the articulating arm and configured to engage the target objective at the ground surface; and
   a ground-fixing system coupled to at least one of the plurality of rigid struts and configured to secure the airframe to the ground surface via a protruding feature of the ground surface, wherein the ground-fixing system comprises a laterally displaceable gripping device having a foot pivotally attached thereto.

10. The unmanned aircraft of claim 9, wherein the ground-fixing system includes a pair of first and second laterally displaceable gripping devices configured to secure the protruding feature below the airframe.

11. The unmanned aircraft of claim 10, wherein each of the first and second laterally displaceable gripping devices includes a threaded rod and a rod-driving actuator.

12. The unmanned aircraft of claim 11, wherein each of the first and second laterally displaceable gripping devices is configured to drive its threaded rod to secure the protruding feature therebetween.

13. The unmanned aircraft of claim 12, wherein each of the first and second laterally displaceable gripping devices is configured to contact the protruding feature via the feet.

14. A method of manipulating a target objective via a multi-rotor vertical take-off and landing (VTOL) aircraft, the method comprising:
   navigating the multi-rotor VTOL aircraft to a waypoint associated with the target objective;
   landing the multi-rotor VTOL aircraft on a ground surface at the waypoint, wherein the multi-rotor VTOL comprises a plurality of rigid struts configured to support an airframe of the multi-rotor VTOL aircraft when the multi-rotor VTOL is on the ground surface;
   securing the multi-rotor VTOL aircraft to the ground surface via a ground-fixing system coupled to at least one of the plurality of rigid struts, wherein the ground-fixing system includes two or more laterally displaceable gripping devices configured to clamp onto a protruding feature of the ground surface; and
   engaging the target objective via an end-effector coupled to a distal end of an articulating arm, wherein the articulating arm is coupled at its proximal end to the multi-rotor VTOL aircraft.

15. The method of claim 14, wherein each of the two or more laterally displaceable gripping device includes a rod-driving actuator and a threaded rod having a foot pivotally attached thereto.

16. The method of claim 14, further comprising the step of controlling a propulsor of the multi-rotor VTOL aircraft to generate a force that pushes the multi-rotor VTOL aircraft against the ground surface.

17. The aircraft of claim 9, wherein the foot includes a gripping material to increase friction with, or conform to, a surface of the protruding feature.

* * * * *